(12) United States Patent
Bauer et al.

(10) Patent No.: US 12,626,403 B2
(45) Date of Patent: May 12, 2026

(54) DETECTING OBJECTS OF INTERESTS IN PANORAMIC IMAGES OF AN ENVIRONMENT

(71) Applicant: FARO Technologies, Inc., Lake Mary, FL (US)

(72) Inventors: Heiko Bauer, Moeglingen (DE); Changyu Du, Offenbach am Main (DE)

(73) Assignee: FARO Technologies, Inc., Lake Mary, FL (US)

( * ) Notice: Subject to any disclaimer, the term of this patent is extended or adjusted under 35 U.S.C. 154(b) by 168 days.

(21) Appl. No.: 18/626,886

(22) Filed: Apr. 4, 2024

(65) Prior Publication Data

US 2024/0346690 A1    Oct. 17, 2024

Related U.S. Application Data

(60) Provisional application No. 63/457,218, filed on Apr. 5, 2023.

(51) Int. Cl.

| | |
|---|---|
| *G06T 7/73* | (2017.01) |
| *G01S 17/42* | (2006.01) |
| *G06T 17/00* | (2006.01) |
| *G06V 10/46* | (2022.01) |
| *G06V 10/50* | (2022.01) |
| *G06V 10/75* | (2022.01) |
| *G06V 20/64* | (2022.01) |

(52) U.S. Cl.
CPC .............. *G06T 7/75* (2017.01); *G01S 17/42* (2013.01); *G06T 17/00* (2013.01); *G06V 10/46* (2022.01); *G06V 10/50* (2022.01); *G06V 10/751* (2022.01); *G06V 20/647* (2022.01);

*G06T 2210/12* (2013.01); *G06T 2210/21* (2013.01); *G06T 2210/22* (2013.01); *G06T 2210/56* (2013.01)

(58) Field of Classification Search
CPC ......... G01S 17/42; G06T 17/00; G06T 19/20; G06T 2207/10024; G06T 2207/10028; G06T 2207/20081; G06T 2207/20084; G06T 2210/12; G06T 2210/21; G06T 2210/22; G06T 2210/56; G06T 2219/2021; G06T 7/50; G06T 7/73; G06T 7/75; G06V 10/46; G06V 10/50; G06V 10/751; G06V 20/64; G06V 20/647
See application file for complete search history.

(56) References Cited

U.S. PATENT DOCUMENTS

| | | | | |
|---|---|---|---|---|
| 2016/0140744 | A1* | 5/2016 | Strelow | G06T 3/14 |
| | | | | 382/284 |
| 2018/0139431 | A1* | 5/2018 | Simek | H04N 23/45 |
| 2022/0318540 | A1* | 10/2022 | Wohlfeld | G06T 19/20 |
| 2023/0206387 | A1* | 6/2023 | Mai | G06T 3/16 |
| | | | | 382/103 |

* cited by examiner

*Primary Examiner* — Sing-Wai Wu

(74) *Attorney, Agent, or Firm* — McCarter & English, LLP; Dave S. Christensen; Joseph C. Drish

(57) ABSTRACT

Examples described herein provide a method for generating a three-dimensional (3D) model of an object of interest using panoramic images of an environment. The method includes detecting, using a trained machine learning model, the object of interest in a panoramic image of the environment. The method further includes determining 3D coordinates for the object of interest. The method further includes combining the 3D coordinates for the object of interest with an existing 3D model of the object of interest to create a revised 3D model of the object of interest.

20 Claims, 15 Drawing Sheets

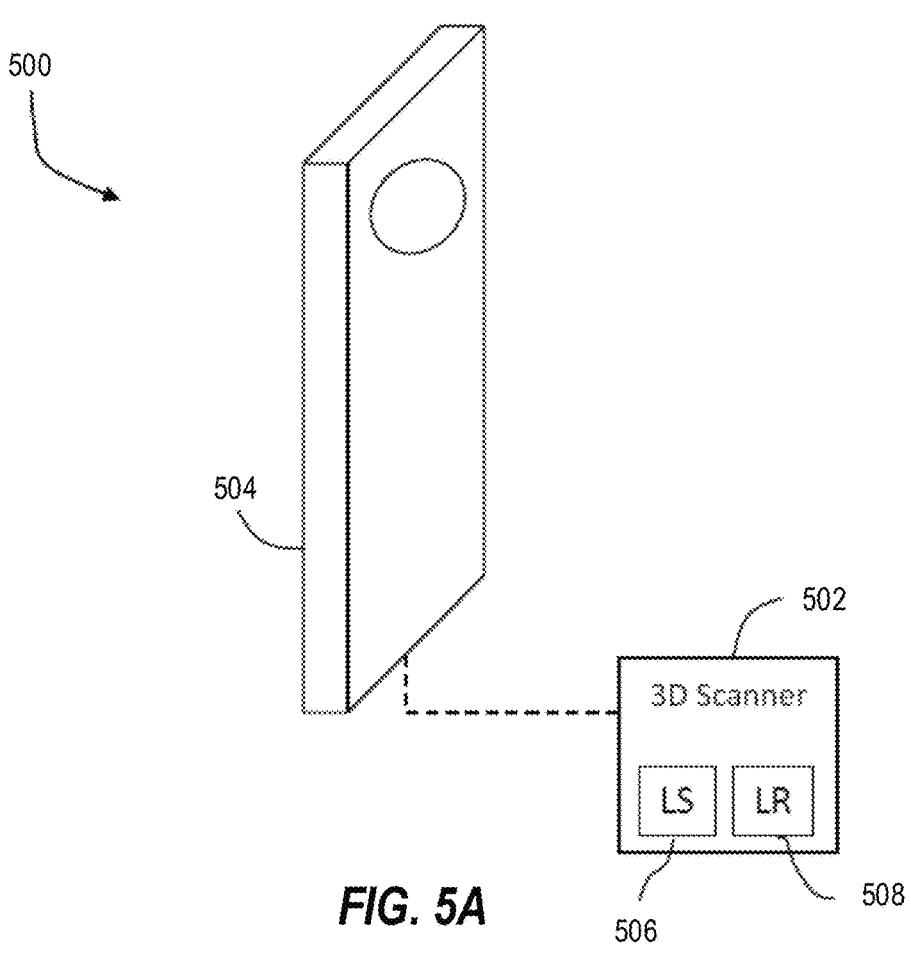
*FIG. 5A*
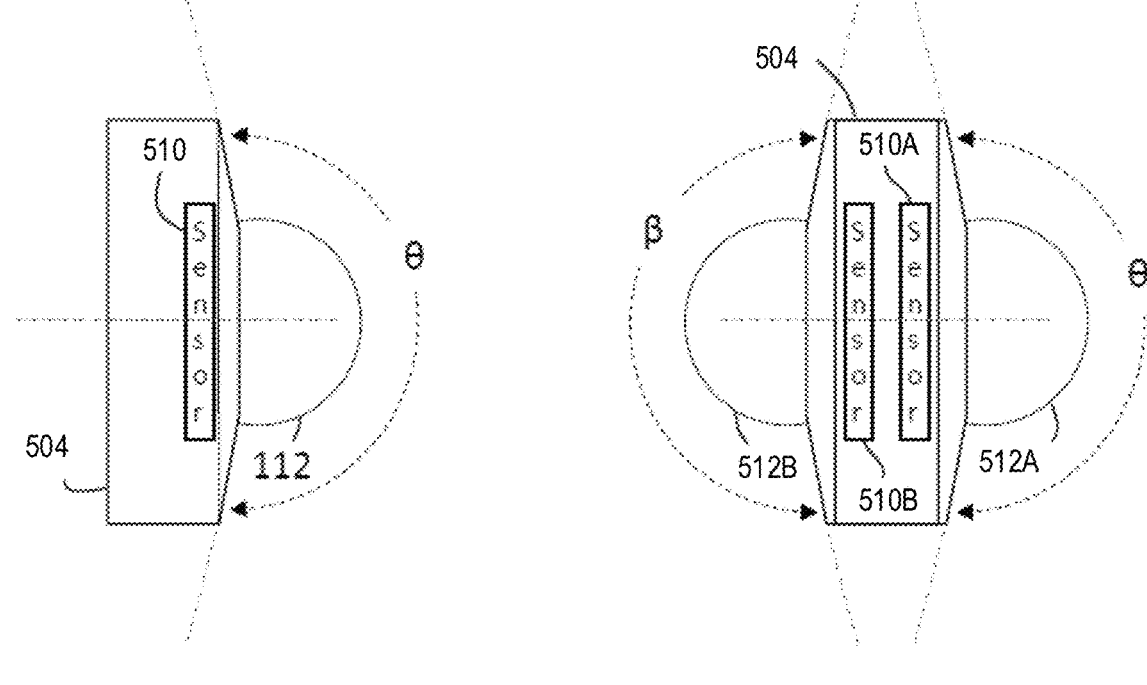
*FIG. 5B*          *FIG. 5C*

800

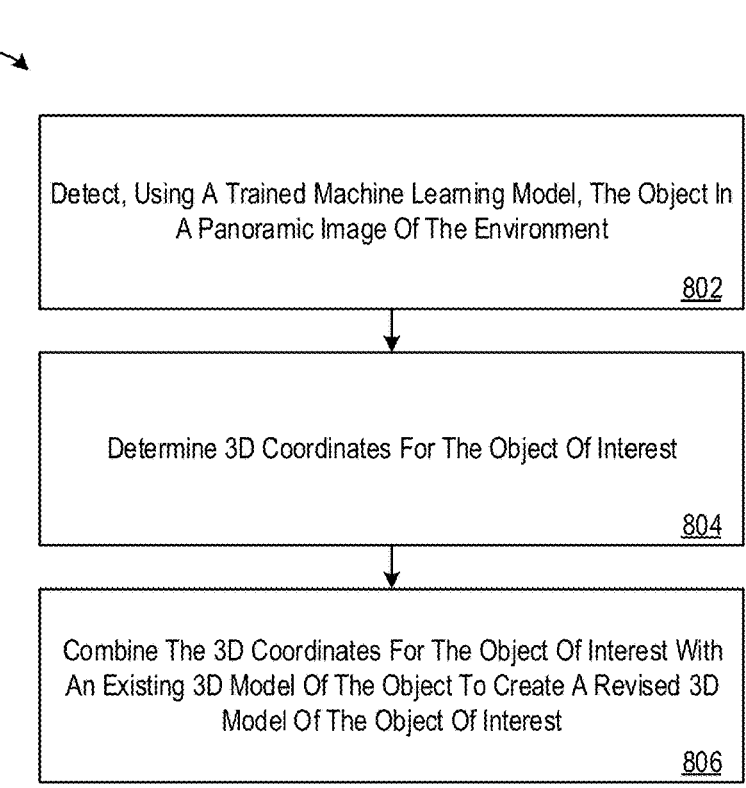

Detect, Using A Trained Machine Learning Model, The Object In A Panoramic Image Of The Environment

802

Determine 3D Coordinates For The Object Of Interest

804

Combine The 3D Coordinates For The Object Of Interest With An Existing 3D Model Of The Object To Create A Revised 3D Model Of The Object Of Interest

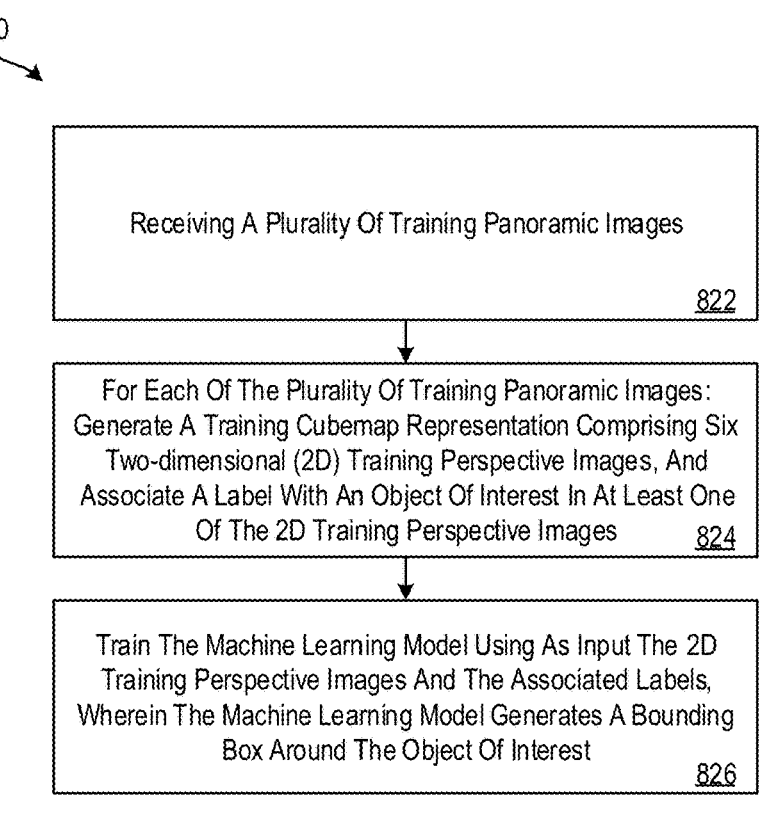

Receiving A Plurality Of Training Panoramic Images

822

For Each Of The Plurality Of Training Panoramic Images: Generate A Training Cubemap Representation Comprising Six Two-dimensional (2D) Training Perspective Images, And Associate A Label With An Object Of Interest In At Least One Of The 2D Training Perspective Images   824

Train The Machine Learning Model Using As Input The 2D Training Perspective Images And The Associated Labels, Wherein The Machine Learning Model Generates A Bounding Box Around The Object Of Interest

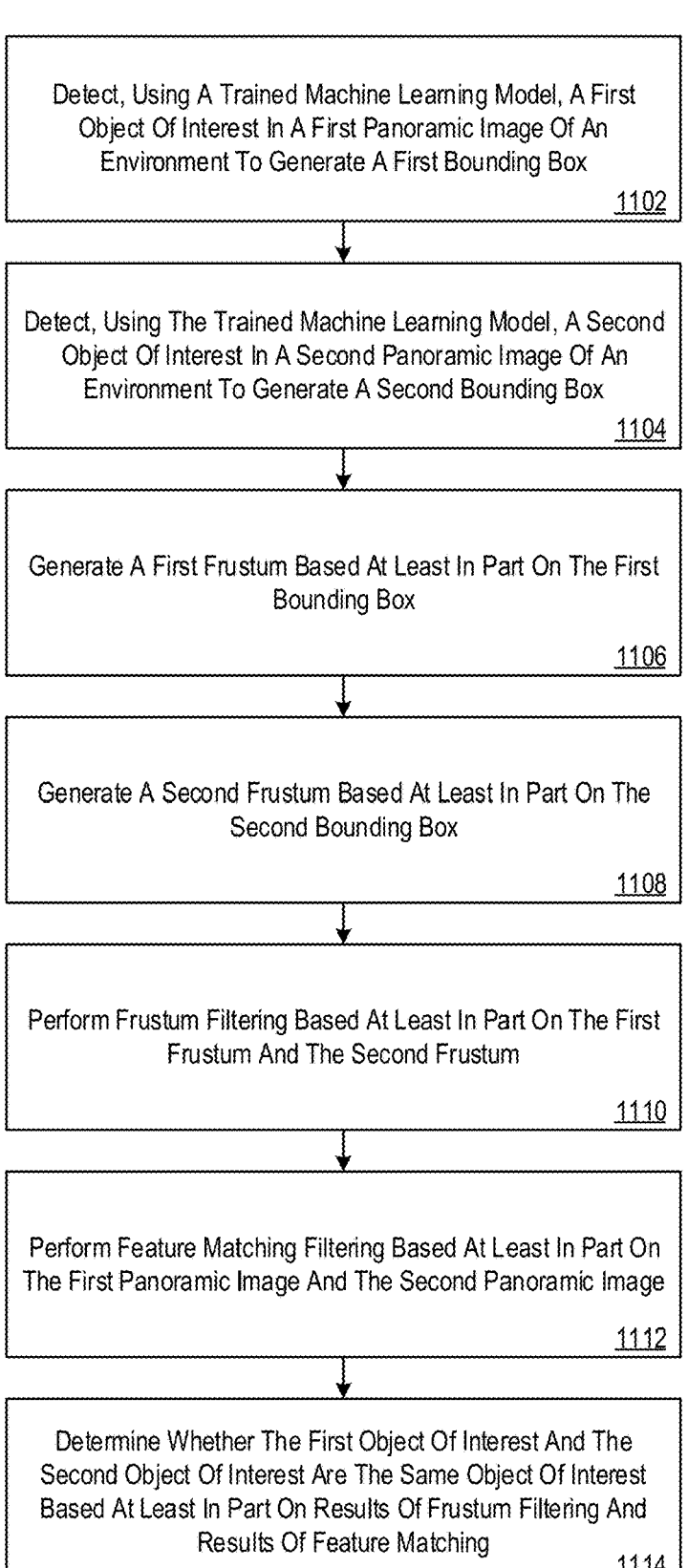

Detect, Using A Trained Machine Learning Model, A First Object Of Interest In A First Panoramic Image Of An Environment To Generate A First Bounding Box

1102

Detect, Using The Trained Machine Learning Model, A Second Object Of Interest In A Second Panoramic Image Of An Environment To Generate A Second Bounding Box

1104

Generate A First Frustum Based At Least In Part On The First Bounding Box

1106

Generate A Second Frustum Based At Least In Part On The Second Bounding Box

1108

Perform Frustum Filtering Based At Least In Part On The First Frustum And The Second Frustum

1110

Perform Feature Matching Filtering Based At Least In Part On The First Panoramic Image And The Second Panoramic Image

1112

Determine Whether The First Object Of Interest And The Second Object Of Interest Are The Same Object Of Interest Based At Least In Part On Results Of Frustum Filtering And Results Of Feature Matching

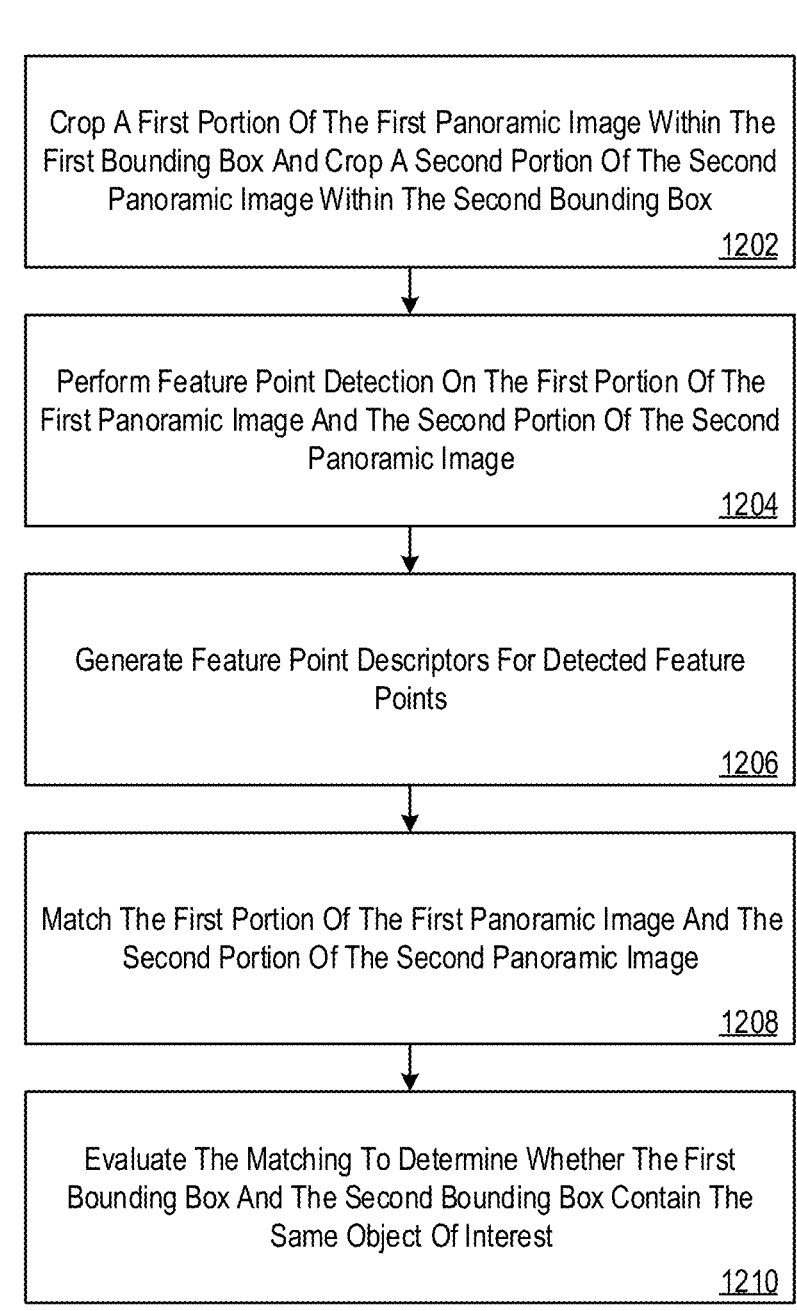

Crop A First Portion Of The First Panoramic Image Within The First Bounding Box And Crop A Second Portion Of The Second Panoramic Image Within The Second Bounding Box

1202

Perform Feature Point Detection On The First Portion Of The First Panoramic Image And The Second Portion Of The Second Panoramic Image

1204

Generate Feature Point Descriptors For Detected Feature Points

1206

Match The First Portion Of The First Panoramic Image And The Second Portion Of The Second Panoramic Image

1208

Evaluate The Matching To Determine Whether The First Bounding Box And The Second Bounding Box Contain The Same Object Of Interest

DETECTING OBJECTS OF INTERESTS IN PANORAMIC IMAGES OF AN ENVIRONMENT

CROSS REFERENCE TO RELATED APPLICATIONS

This application claims the benefit of U.S. Provisional Patent Application Ser. No. 63/457,218, filed Apr. 5, 2023 and entitled "DETECTING OBJECTS OF INTERESTS IN PANORAMIC IMAGES OF AN ENVIRONMENT," the contents of which are incorporated by reference herein in their entirety.

BACKGROUND

The subject matter disclosed herein relates to use of a three-dimensional (3D) coordinate measurement device, such as a laser scanner time-of-flight (TOF) coordinate measurement device referred to as a "TOF scanner," "3D laser scanner," or "laser scanner." A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They can also be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

One application where 3D scanners are used is to scan an environment.

While existing 3D coordinate measurement devices are suitable for their intended purposes, what is needed is a 3D coordinate measurement device having certain features of embodiments described herein.

BRIEF DESCRIPTION

In one embodiment, a method for generating a three-dimensional (3D) model of an object of interest using panoramic images of an environment is provided. The method includes detecting, using a trained machine learning model, the object of interest in a panoramic image of the environment. The method further includes determining 3D coordinates for the object of interest. The method further includes combining the 3D coordinates for the object of interest with an existing 3D model of the object of interest to create a revised 3D model of the object of interest.

In addition to one or more of the features described herein, or as an alternative, further embodiments of the system can include a panoramic camera to capture panoramic images of the environment, and a processing system communicatively coupled to the panoramic camera. The processing system includes a memory having computer readable instructions, and a processing device for executing the computer readable instructions. The computer readable instructions control the processing device to perform operations for generating a three-dimensional (3D) model of an object of interest using panoramic images of an environment. The operations include detecting, using a trained machine learning model, the object of interest in a panoramic image of the environment. The operations further include determining 3D coordinates for the object of interest. The operations further include combining the 3D coordinates for the object of interest with an existing 3D model of the object of interest to create a revised 3D model of the object of interest.

In another embodiment, a method for training a machine learning model to detect objects in panoramic images is provided. The method includes receiving a plurality of training panoramic images. The method further includes, for each of the plurality of training panoramic images: generating a training cubemap representation having six two-dimensional (2D) training perspective images, and associating a label with an object of interest in at least one of the 2D training perspective images. The method further includes training the machine learning model using as input the 2D training perspective images and the associated labels, wherein the machine learning model generates a bounding box around the object of interest.

In another embodiment, a system is provided. The system includes a panoramic camera to capture a plurality of training panoramic images of the environment. The system further includes a processing system communicatively coupled to the panoramic camera. The processing system includes a memory having computer readable instructions and a processing device for executing the computer readable instructions. The computer readable instructions control the processing device to perform operations for training a machine learning model to detect objects in panoramic images. The operations include, for each of the plurality of training panoramic images: generating a training cubemap representation having six two-dimensional (2D) training perspective images, and associating a label with an object of interest in at least one of the 2D training perspective images. The operations further include training the machine learning model using as input the 2D training perspective images and the associated labels, wherein the machine learning model generates a bounding box around the object of interest.

In another embodiment, a method is provided. The method includes detecting, using a trained machine learning model, a first object of interest in a first panoramic image of an environment to generate a first bounding box. The method further includes detecting, using the trained machine learning model, a second object of interest in a second panoramic image of an environment to generate a second bounding box. The method further includes generating a first frustum based at least in part on the first bounding box. The method further includes generating a second frustum based at least in part on the second bounding box. The method further includes performing frustum filtering based at least in part on the first frustum and the second frustum. The method further includes performing feature matching filtering based at least in part on the first panoramic image and the second panoramic image. The method further includes determining whether the first object of interest and the second object of interest are the same object of interest based at least in part on results of the frustum filtering and results of the feature matching filtering.

In another embodiment, a system is provided. The system includes a panoramic camera to capture a plurality of panoramic images of the environment including a first panoramic image and a second panoramic image. The system further includes a processing system communicatively coupled to the panoramic camera. The processing system includes a memory having computer readable instructions, and a processing device for executing the computer readable instructions. The computer readable instructions control the processing device to perform operations. The operations include detecting, using a trained machine learning model, a first object of interest in a first panoramic image of an environment to generate a first bounding box. The operations further include detecting, using the trained machine learning model, a second object of interest in a second panoramic image of an environment to generate a second bounding box. The operations further include generating a first frustum based at least in part on the first bounding box. The operations further include generating a second frustum based at least in part on the second bounding box. The operations further include performing frustum filtering based at least in part on the first frustum and the second frustum. The operations further include performing feature matching filtering based at least in part on the first panoramic image and the second panoramic image. The operations further include determining whether the first object of interest and the second object of interest are the same object of interest based at least in part on results of the frustum filtering and results of the feature matching filtering.

The above features and advantages, and other features and advantages, of the disclosure are readily apparent from the following detailed description when taken in connection with the accompanying drawings.

BRIEF DESCRIPTION OF DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

FIG. 5A is a schematic image of a three-dimensional measurement device having a camera in accordance with an embodiment;

FIG. 5B is a schematic view of an omnidirectional camera for use with the three-dimensional measurement device of FIG. 5A in accordance with an embodiment;

FIG. 5C is a schematic view of an omnidirectional camera system with a dual camera for use with the three-dimensional measurement device of FIG. 5A;

FIG. 5D' and FIG. 5E' are images of the dual camera of FIG. 5C where each of the images has a field of view greater than 580 degrees;

FIG. 8A is a flow diagram of a method for generating and/or updating a 3D model of an object using panoramic images of an environment according to one or more embodiments described herein;

FIG. 8B is a flow diagram of a method for training a machine learning model according to one or more embodiments described herein;

FIG. 11 is a flow diagram of a method for filtering objects of interest from a plurality of panoramic images according to one or more embodiments described herein;

FIG. 12 is a flow diagram of a method for performing feature matching filtering according to one or more embodiments described herein;

Figure 1:
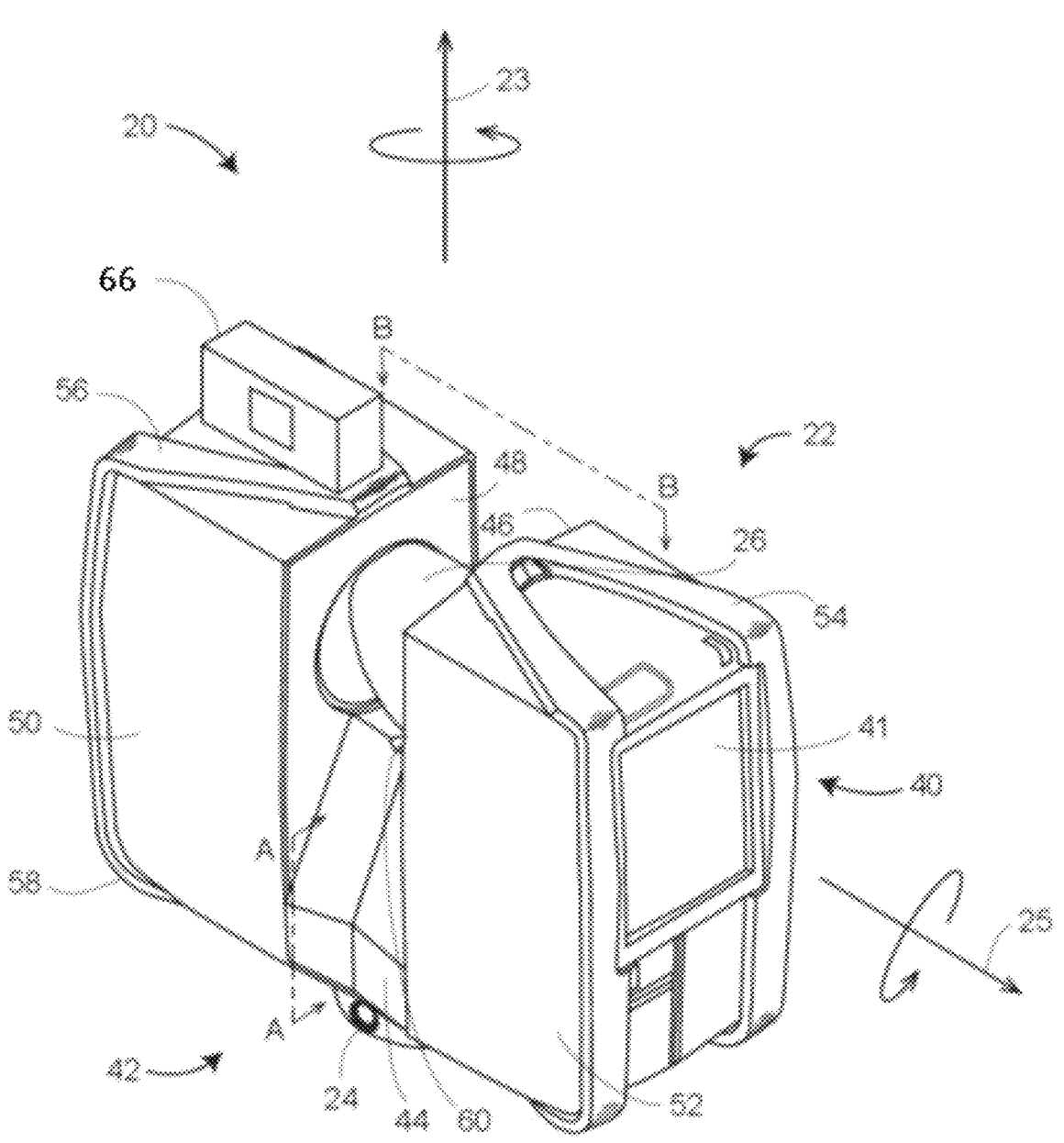
FIG. 1 is a perspective view of a laser scanner according to one or more embodiments described herein.

The detailed description explains embodiments of the disclosure, together with advantages and features, by way of example with reference to the drawings.

DETAILED DESCRIPTION

Embodiments described herein provide for detecting objects of interest in panoramic images of an environment. For example, panoramic images can be captured of an environment. The panoramic images can include an object of interest. One or more embodiments described herein provide for detecting the object of interest in the panoramic images, determining 3D coordinates for the object of interest, and generating and/or updating the 3D model of the object of interest using the 3D coordinates for the object of interest. One or more embodiments described herein provide for training a machine learning model to detect objects of interest in panoramic images using cubemap representations. One or more embodiments described herein provide for detecting and filtering duplicate objects of interest within panoramic images by generating frustums, filtering frustums, and performing feature matching filtering. Detecting and filtering duplicate objects of interest is a difficult and time consuming task that cannot be reasonably be performed in the human mind because of the large amounts of data and details contained within panoramic images. Moreover, detecting and filtering duplicate objects of interest improves processing systems by reducing the amount of data storage required to store 3D data for objects of interest because duplicates can be removed. These and other features of one or more embodiments are now described in more detail.

Three-dimensional (3D) coordinate measurement devices, such as laser scanners, can be used to captured 3D data about an environment. The 3D data can be presented on a device, such as a smartphone, tablet, heads-up display, etc., as a graphical representation. In some cases, the graphical representation of the point cloud can be overlaid on a video stream of the environment that the point cloud represents. Panoramic images can also be captured of the environment. For example, a 3D coordinate measurement device can include or be associated with (e.g., communicatively and/or physically coupled) to a panoramic camera. Thus, the 3D coordinate measurement device can capture 3D data about the environment and the panoramic camera can capture panoramic images of the environment.

Generating an image use at least three values for each data point. These three values can include the distance and two angles, or transformed values, such as the x, y, z coordinates. In an embodiment, an image is also based on a fourth gray-scale value, which is a value related to irradiance of scattered light returning to the scanner.

Some 3D laser scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images are transmitted to a processor to add color to the scanner image. To generate a color scanner image, at least three positional coordinates (such as x, y, z) and three color values (such as red, green, blue "RGB") are collected for each data point.

Figure 2:
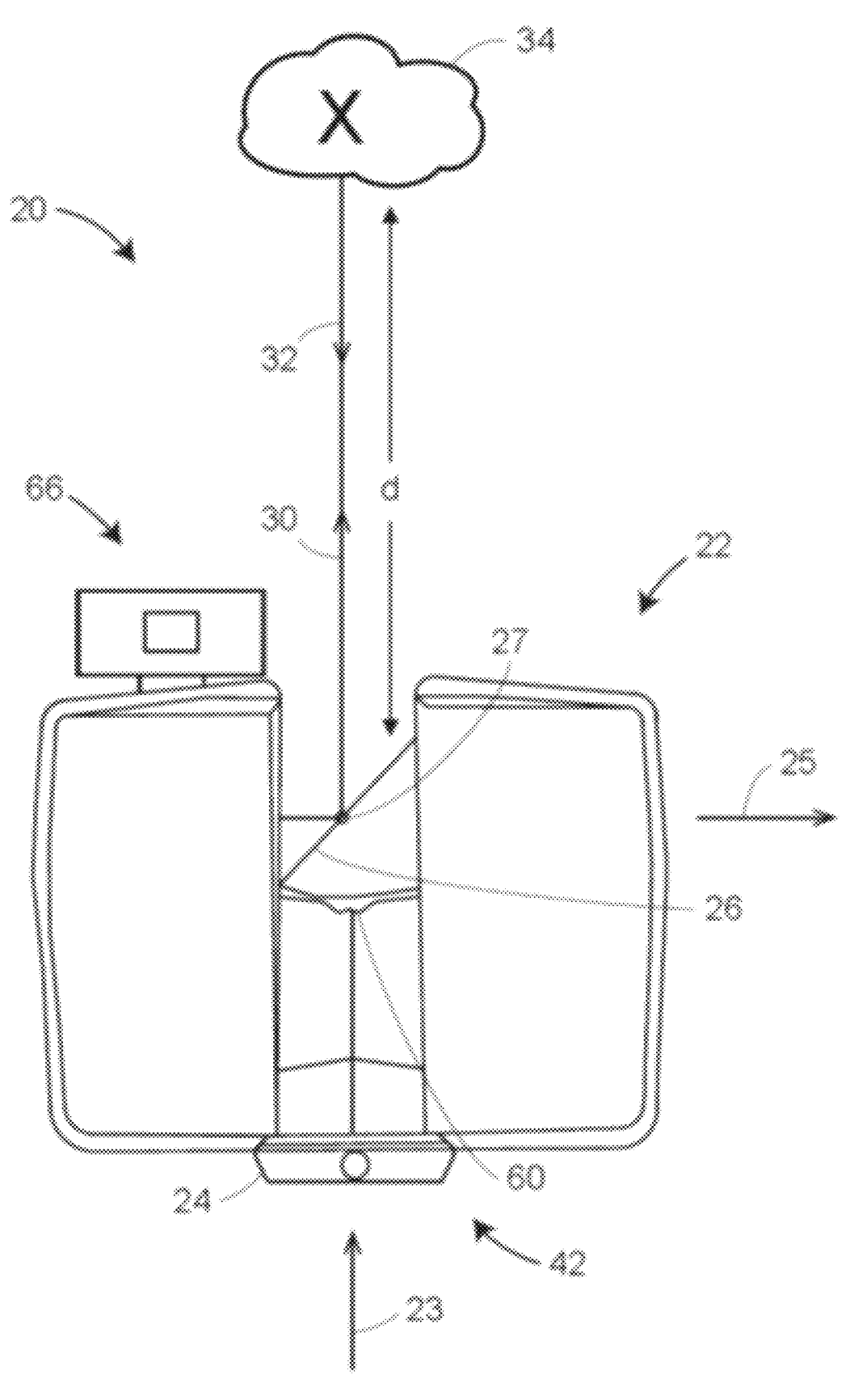
FIG. 2 is a side view of the laser scanner illustrating a method of measurement according to one or more embodiments described herein.
Figure 3:
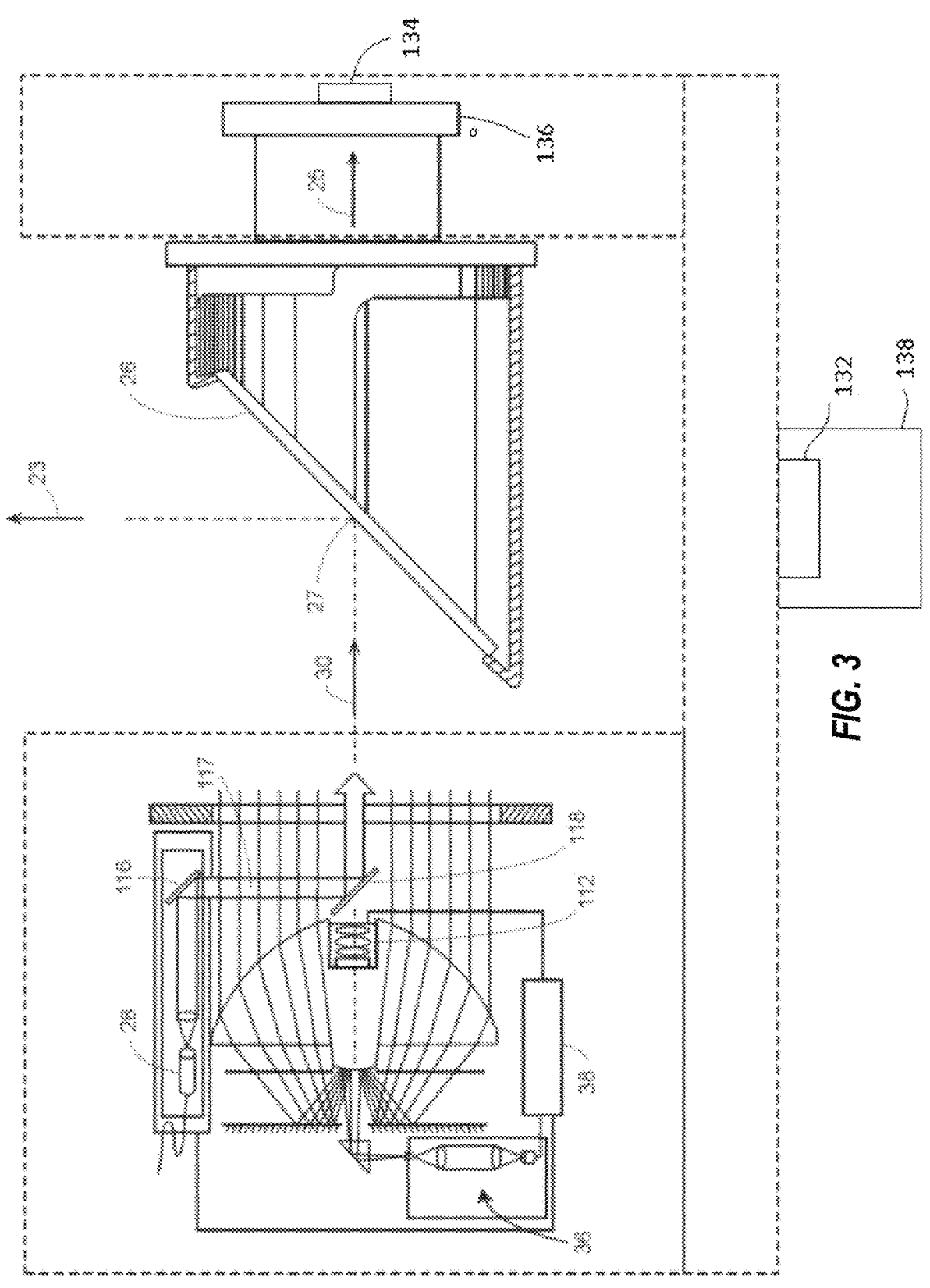
FIG. 3 is a schematic illustration of the optical, mechanical, and electrical components of the laser scanner according to one or more embodiments described herein.

Referring now to FIGS. 1-3, a 3D coordinate measurement device, such as a laser scanner 20, is shown for optically scanning and measuring the environment surrounding the laser scanner 20 according to one or more embodiments described herein. The laser scanner 20 has a measuring head 22 and a base 24. The measuring head 22 is mounted on the base 24 such that the laser scanner 20 is rotated about a vertical axis 23. In one embodiment, the measuring head 22 includes a gimbal point 27 that is a center of rotation about the vertical axis 23 and a horizontal axis 25. The measuring head 22 has a rotary mirror 26, which is rotated about the horizontal axis 25. The rotation about the vertical axis is about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis are substituted for the terms vertical axis and horizontal axis, respectively. The term pan axis or standing axis is also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam has a wavelength range of approximately 300 to 1600 nanometers, for example 790 nanometers, 905 nanometers, 1550 nm, or less than 400 nanometers. It should be appreciated that in other embodiments, other electromagnetic radiation beams having greater or smaller wavelengths are also used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the laser scanner 20 is also collecting gray-scale information related to the received optical power (equivalent to the term "brightness.") The gray-scale value is determined at least in part, for example, by integration of the bandpass-filtered and amplified signal in the light receiver 36 over a measuring period attributed to the object point X.

In an embodiment, the measuring head 22 includes a display device 40 integrated into the laser scanner 20. The display device 40 includes a graphical touch screen 41, as shown in FIG. 1, which allows the operator to set the parameters or initiate the operation of the laser scanner 20. For example, the screen 41 has a user interface that allows the operator to provide measurement instructions to the device, and the screen also displays measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 are coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44.

When the mirror 26 rotates, during each rotation the mirror 26 directs the emitted light beam 30 onto the traverse 44 and the prism 60. Due to non-linearities in the electronic components, for example in the light receiver 36, the measured distances d depend on signal strength, which is measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 is used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 is a device that captures and measures a parameter associated with the scanned area or the scanned object and provides a signal representing the measured quantities over an image acquisition area. In one or more embodiments, the auxiliary image acquisition device 66 is a pyrometer, a thermal imager, an ionizing radiation detector, or a millimeter-wave detector. In an embodiment, the auxiliary image acquisition device 66 is a color camera with an ultrawide-angle lens, sometimes referred to as a "ultrawide-angle camera" or a "panoramic camera." In an embodiment, as shown in FIGS. 1 and 2, the auxiliary image acquisition device 66 is physically coupled to and/or integrated with the laser scanner 20. In another embodiment, the auxiliary image acquisition device 66 is separate from, but associated with, the laser scanner 20. For example, a camera 104 (e.g., the auxiliary image acquisition device 66) can be associated with a 3D scanner 102 (e.g., the laser scanner 20), as shown in FIG. 5A.

In an embodiment, a central color camera (first image acquisition device) 112 is located internally to the scanner and has the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 is a near infrared laser light (for example, light at wavelengths of 780 nm or 1250 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view is easily obtained by simply adjusting the steering mechanisms of the scanner—for example, by adjusting the azimuth angle about the axis 23 and by steering the mirror 26 about the axis 25.

Figure 4:
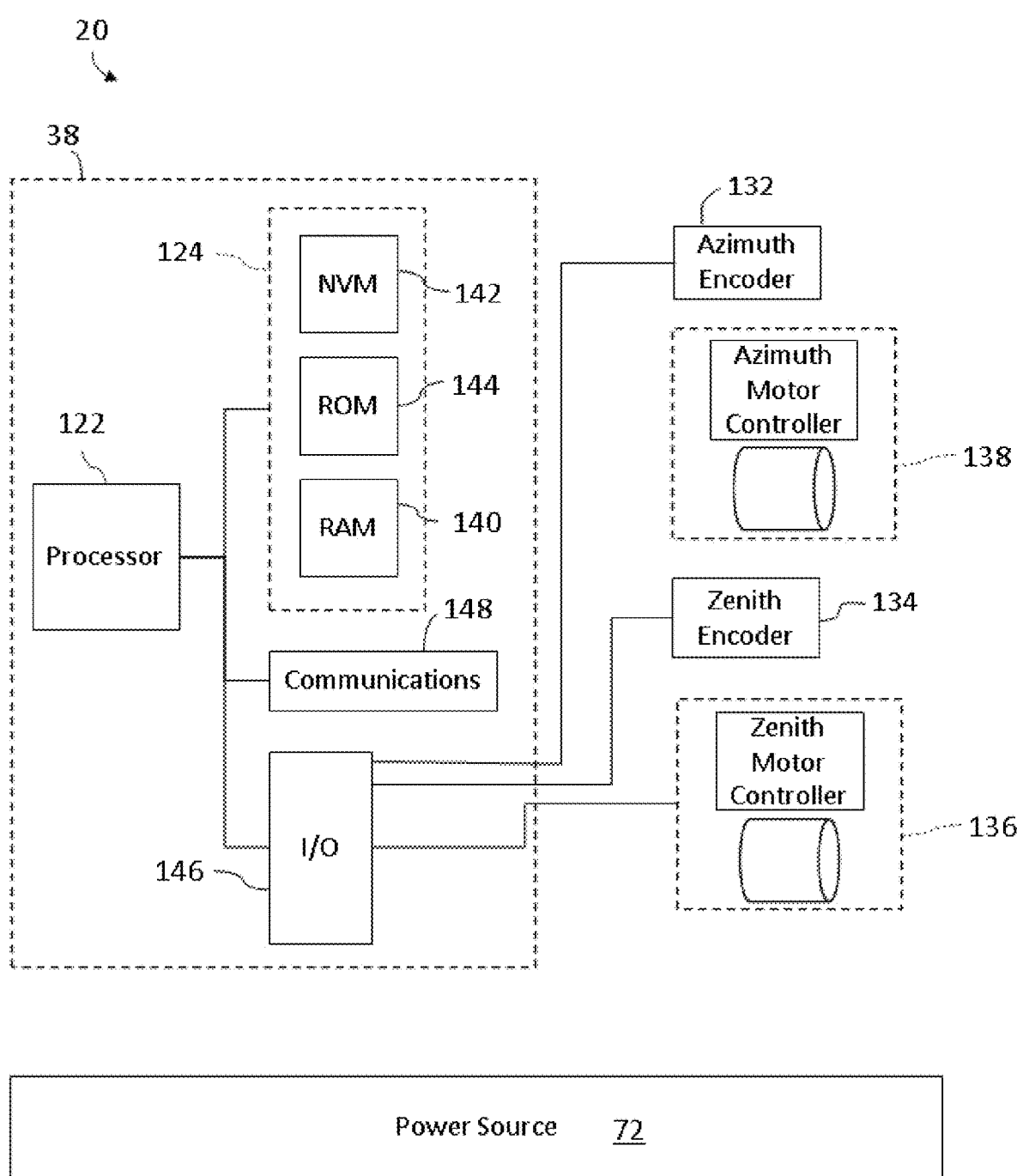
FIG. 4 is a schematic illustration of the laser scanner of FIG. 1 according to one or more embodiments described herein.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. In one or more embodiments, the processors are microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 is displayed on a user interface 40 coupled to controller 38. The user interface 40 includes one or more LEDs (light-emitting diodes) 82, an LCD (liquid-crystal diode) display, a CRT (cathode ray tube) display, a touch-screen display or the like. A keypad is also coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 is also coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and/or the like including combinations and/or multiples thereof. Additional systems 20 are also connected to LAN with the controllers 38 in each of these systems 20 being configured to send and receive data to and from remote computers and other systems 20. The LAN is connected to the Internet. This connection allows controller 38 to communicate with one or more remote computers connected to the Internet.

The processors 122 are coupled to memory 124. The memory 124 includes random access memory (RAM) device 140, a non-volatile memory (NVM) device 142, and a read-only memory (ROM) device 144. In addition, the processors 122 are connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in application code (e.g., program instructions executable by a processor to cause the processor to perform operations). These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

It should be appreciated that while embodiments herein describe the 3D coordinate measurement device as being a laser scanner, this is for example purposes and the claims should not be so limited. In other embodiments, the 3D coordinate measurement device are be another type of system that measures a plurality of points on surfaces (i.e., generates a point cloud), such as but not limited to a triangulation scanner, a structured light scanner, a photogrammetry device, a light detection and ranging (LIDAR) device, and/or the like including combinations and/or multiples thereof, for example.

Referring now to FIGS. 5A, 5B, 5C, an embodiment of an image acquisition system 500 for measuring coordinates, such as three-dimensional coordinates, in the environment. The system 500 includes a coordinate measurement device 502 having an ultra-wide angle camera 504. The coordinate measurement device 502 or scanner, includes a light source 506 and a light receiver 508. As discussed in more detail herein, the coordinate measurement device 502 is configured to emit light from the light source 506 which is reflected off a surface in the environment and is received by the light receiver 508. In an embodiment, the light receiver 508 is a photosensitive array.

In an embodiment, the camera 504 includes a sensor 510 (FIG. 5B), that includes an array of photosensitive pixels. The sensor 510 is arranged to receive light from a lens 512. In the illustrated embodiment, the lens 512 is an ultra-wide angle lens that provides (in combination with the sensor 510) a field of view θ between substantially 100 and substantially 270 degrees. In an embodiment, the field of view θ is greater than substantially 180 degrees and less than substantially 270 degrees about a vertical axis (e.g. substantially perpendicular to the floor or surface that the measurement device is located). It should be appreciated that while embodiments herein describe the lens 512 as a single lens, this is for example purposes and the lens 512 includes a plurality of optical elements. It should be further appreciated that in other embodiments, the field of view is greater than 63 degrees, less than 180 degrees, or between 63 degrees and 180 degrees for example.

In an embodiment, the camera 504 includes a pair of sensors 510A, 510B that are arranged to receive light from ultra-wide angle lenses 512A, 512B respectively (FIG. 5C). The sensor 510A and lens 512A are arranged to acquire images in a first direction and the sensor 510B and lens 512B are arranged to acquire images in a second direction. In the illustrated embodiment, the second direction is opposite the first direction (e.g. substantially 180 degrees apart). A camera having opposingly arranged sensors and lenses with at least substantially 180 degree field of view are sometimes referred to as an omnidirectional camera, 360 degree camera, or a panoramic camera as it acquires an image in a substantially 360 degree volume about the camera. It should further be appreciated that while embodiments herein refer to a "camera," any suitable image acquisition device having a wide angle field of view (e.g., greater than 63 degrees) is used without deviating from the teachings provided herein.

Figure 5D:
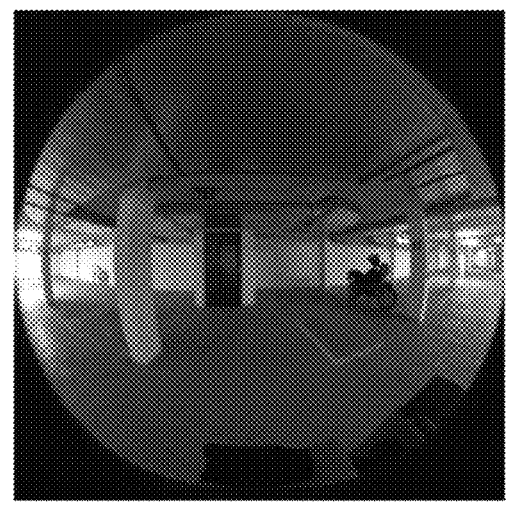
FIG. 5D and FIG. 5E are images acquired by the dual camera of FIG. 5C.
Figure 5E:
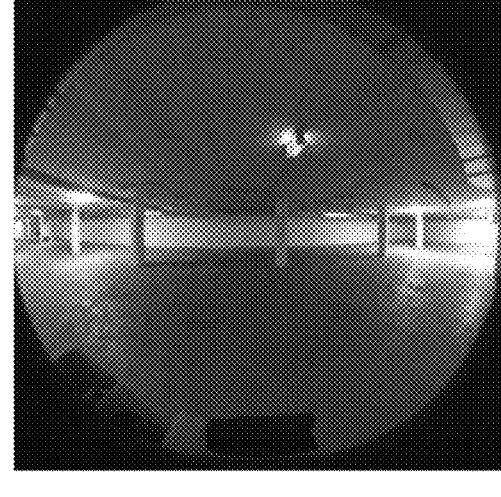
Figure 5D:
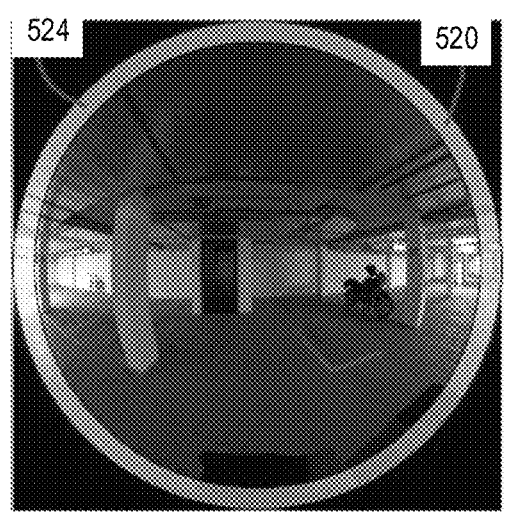
Figure 5E:
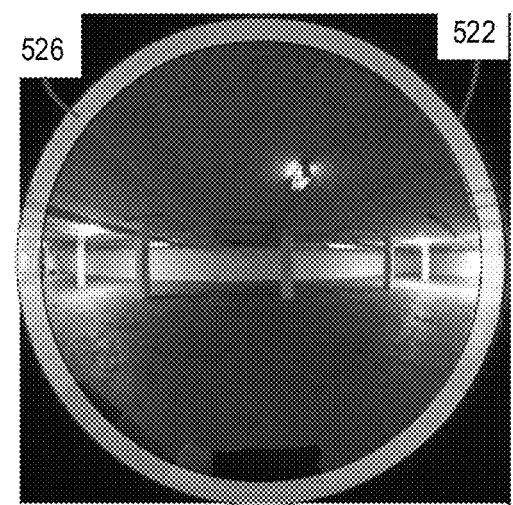
Figure 5F:
FIG. 5F is a merged image formed from the images of FIG. 5D and FIG. 5E in accordance with an embodiment.

It should be appreciated that when the field of view is greater than substantially 180 degrees, there will be an overlap 520, 522 between the acquired images 524, 526 as shown in FIG. 5D' and FIG. 5E'. In some embodiments, the images are combined to form a single image 528 of at least a substantial portion of the spherical volume about the camera 504 as shown in FIG. 5F.

In some situations, it is desirable to combine 3D data (e.g., 3D coordinates) from multiple scan points relative to the environment. For example, an environment can have multiple 3D coordinate measurement devices (e.g., the laser scanner 20, the 3D scanner 502, and/or the like including combinations and/or multiples thereof) positioned therein or in proximity thereto, where each 3D coordinate measurement devices scans at least part of the environment to capture 3D data about the environment. As another example, a single 3D coordinate measurement device can be moved within or relative to an environment to capture 3D data at different scan points. A scan point is a location where a 3D coordinate measurement device captures 3D data. In some cases, 3D data is captured over time, which provides for capturing changes to the environment. This is useful, for example, for monitoring progress of a construction site/ building, analyzing usage of an environment (e.g., a factory or manufacturing space), and/or the like including combinations and/or multiples thereof.

When 3D data is captured over time on a period (e.g., daily, weekly, etc.) and/or aperiodic basis, such as from statically mounted 3D coordinate measurement devices at specific scan points within an environment (e.g., a factory), objects are moved during the 3D data capturing. As a result, a specific object is scanned in multiple positions/orientations. By combining the 3D data, a more complete 3D model could be generated over time.

Consider the following example, which is now described with reference to FIG. 6. Particularly, FIG. 6 is a schematic illustration of a processing system 600 for generating and/or updating a 3D model of an object using panoramic images of an environment 622 according to one or more embodiments described herein.

For an environment 622 that is a factory, two 3D coordinate measurement devices 620 (e.g., laser scanner 20) can be mounted at two independent scan points (e.g., opposite walls of the factory). It should be appreciated that two 3D coordinate measurement devices are shown merely as an example and that fewer or more 3D coordinate measurement devices can be used in other embodiments. According to one or more embodiments described herein, one or more 3D coordinate measurement devices can be used to take multiple scans. For example, one of the 3D coordinate measurement devices 620 can capture first scan data at a first scan point and then be moved to a second scan point, where one of the 3D coordinate measurement devices 620 captures second scan data. The two 3D coordinate measurement devices 620 take daily scans of the environment 622 (e.g., factory) to collect 3D data about the environment 622. Panoramic cameras 621 (e.g., the camera 504), associated with the 3D coordinate measurement devices 620 can capture panoramic images of the environment 622 (e.g., factory), such as while the 3D coordinate measurement devices 620 are capturing the 3D data. According to one or more embodiments described herein, panoramic images can be used to generate and/or update a 3D model (e.g., 3D model 609c) of an object of interest. For example, the processing system 600 can detect an object of interest in a panoramic image, using a trained machine learning model. The processing system 600 can then determine 3D coordinates for the object of interest and then use those coordinates to generate and/or update a 3D model for the object of interest.

Figure 13:
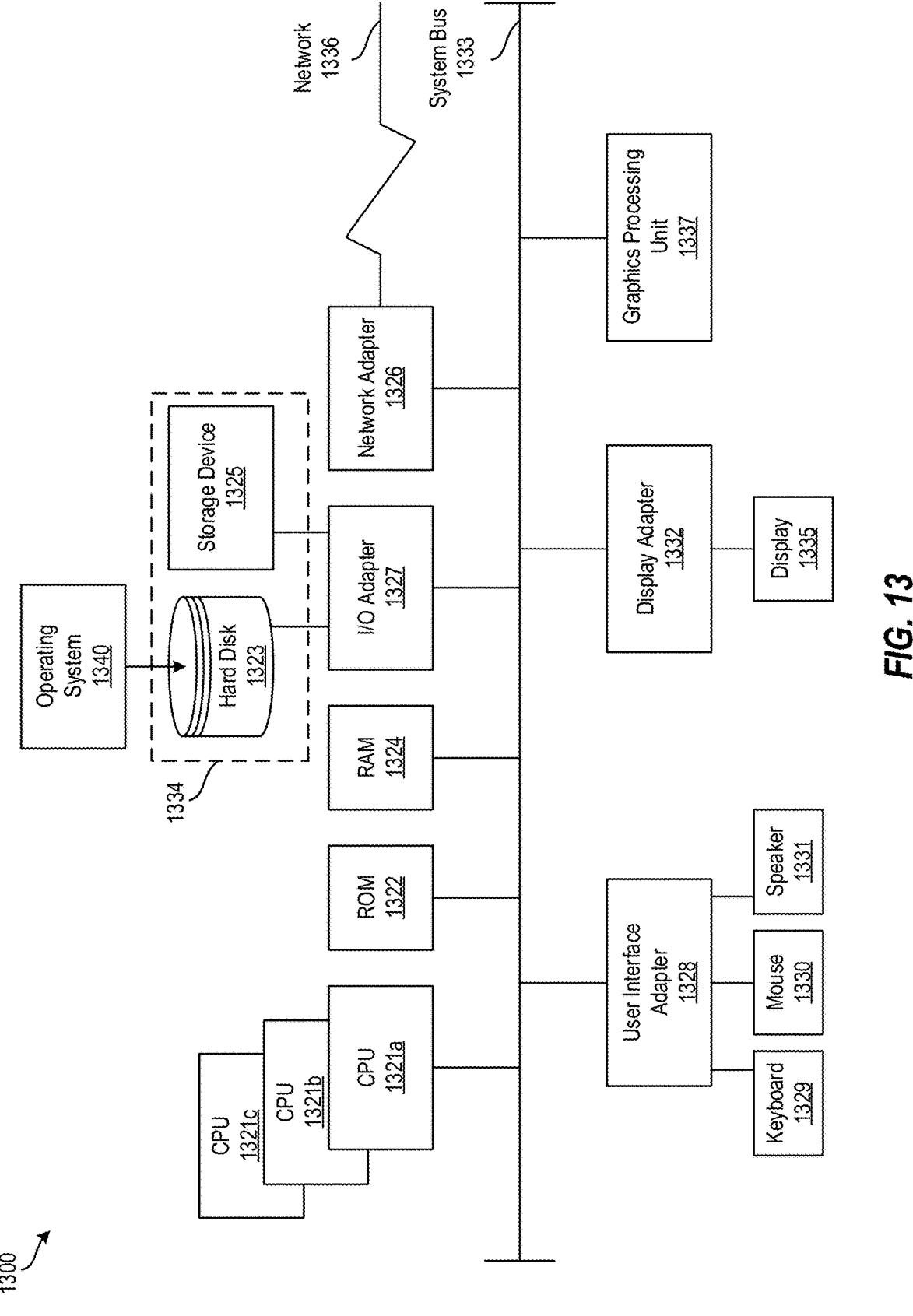
FIG. 13 is a schematic illustration of a processing system for implementing the presently described techniques according to one or more embodiments described herein.

The processing system 600 can be any suitable computing device, such as a laptop computer, a desktop computer, a smartphone, a tablet computer, and/or the like, including combinations and/or multiples thereof. FIG. 13 depicts a processing system 1300, which is an example of the processing system 600. As shown in FIG. 6, the processing system 600 includes a processing device 602 (e.g., one or more of the processing devices 1321 of FIG. 13), a system memory 604 (e.g., the RAM 1324 and/or the ROM 1322 of FIG. 13), a network adapter 606 (e.g., the network adapter 1326 of FIG. 13), a data store 608, a display 610, sensor(s) 611, a data capture engine 612, a machine learning (ML) engine 614, and an analysis engine 616.

Figure 6:
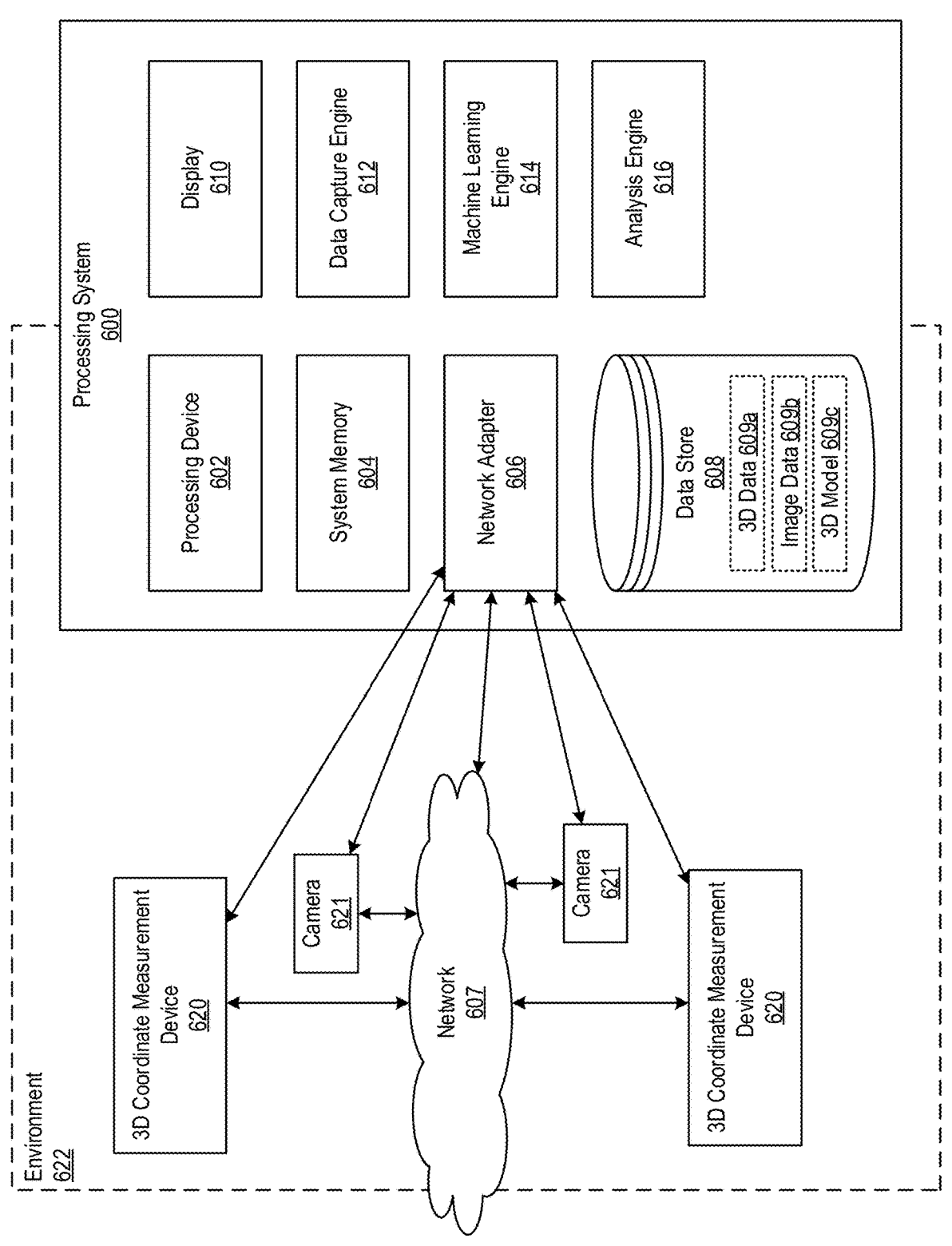
FIG. 6 is a schematic illustration of a processing system for generating and/or updating a 3D model of an object using panoramic images of an environment according to one or more embodiments described herein.

The various components, modules, engines, etc. described regarding FIG. 6 (e.g., the data capture engine 612, the ML engine 614, and the analysis engine 616) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 602 for executing those instructions. Thus, the system memory 604 can store program instructions that when executed by the processing device 602 implement the engines described herein. Other engines can also be utilized to include other features and functionality described in other examples herein.

The network adapter 606 enables the processing system 600 to transmit data to and/or receive data from other sources, such as the 3D coordinate measurement devices 620 and/or the cameras 621. For example, the processing system 600 receives 3D data (e.g., a data set that includes a plurality of three-dimensional coordinates of the environment 622) from one or more of the 3D coordinate measurement devices 620 directly and/or via a network 607. The 3D data from the 3D coordinate measurement devices 620 can be stored in the data store 608 of the processing system 600 as 3D data 609a, which can be used to display a point cloud on the display 610. Similarly, the processing system 600 receives image data (e.g., panoramic images of the environment 622) from one or more of the cameras 621 directly and/or via the network 607. The image data from the cameras 621 can be stored in the data store 608 of the processing system 600 as image data 609b, which can be displayed on the display 610.

The network 607 represents any one or a combination of different types of suitable communications networks such as, for example, cable networks, public networks (e.g., the Internet), private networks, wireless networks, cellular networks, or any other suitable private and/or public networks. Further, the network 607 can have any suitable communication range associated therewith and include, for example, global networks (e.g., the Internet), metropolitan area networks (MANs), wide area networks (WANs), local area networks (LANs), or personal area networks (PANs). In addition, the network 607 can include any type of medium over which network traffic is carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

One or more embodiments described herein provides for training and/or using (e.g., performing inference) a machine learning (ML) model to detect objects (e.g., forklifts, robotic devices, and/or the like including combinations and/or multiples thereof) within the factory using the panoramic images. More specifically, one or more embodiments described herein can incorporate and utilize rule-based decision making and artificial intelligence (AI) reasoning to accomplish the various operations described herein, namely detecting objects using panoramic images. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for detecting objects using panoramic images, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of detecting objects using panoramic images as described herein.

Figure 7:
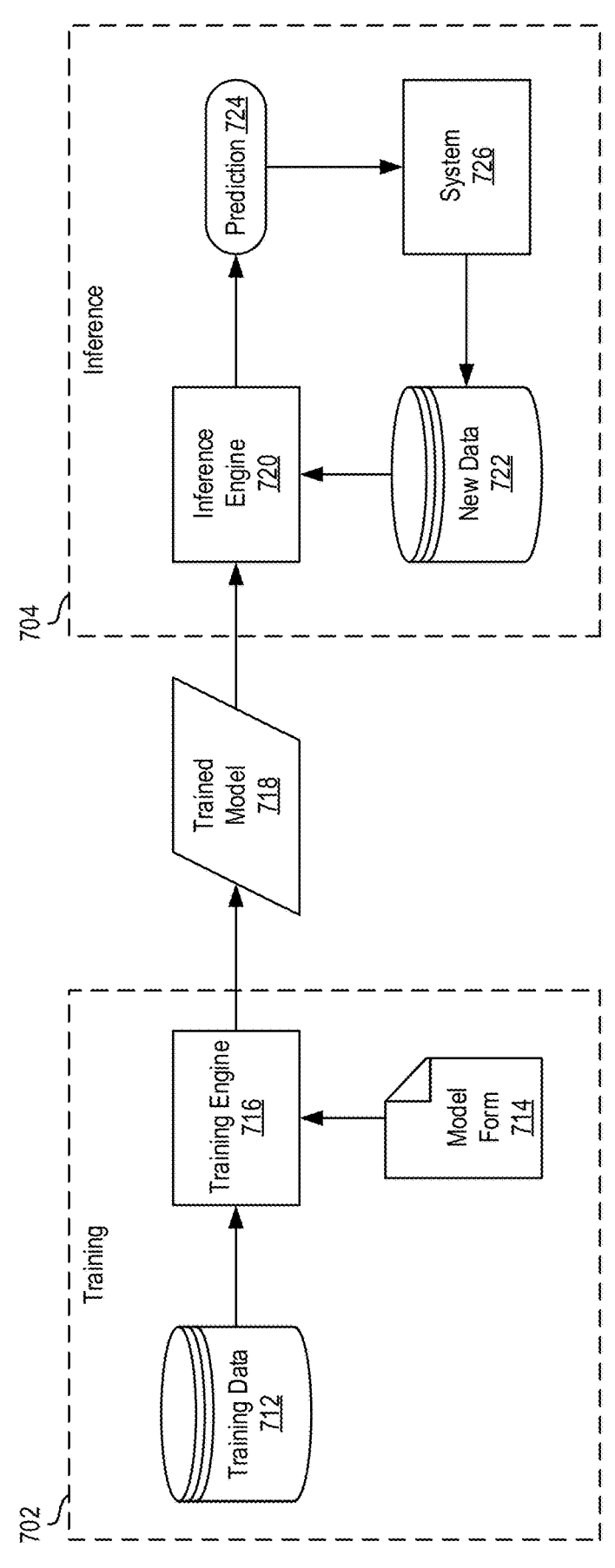
FIG. 7 is a block diagram of components of a machine learning training and inference system according to one or more embodiments described herein.

Systems for training and using a machine learning model are now described in more detail with reference to FIG. 7. Particularly, FIG. 7 depicts a block diagram of components of a machine learning training and inference system 700 according to one or more embodiments described herein. The system 700 performs training 702 and inference 704. During training 702, a training engine 716 trains a model (e.g., the trained model 718) to perform a task, such as to detect objects using panoramic images. Inference 704 is the process of implementing the trained model 718 to perform the task, such as to detect objects using panoramic images, in the context of a larger system (e.g., a system 726). All or a portion of the system 700 shown in FIG. 7 can be implemented, for example by all or a subset of the processing system 600 of FIG. 6, the processing system 1300 of FIG. 13, and/or the like including combinations and/or multiples thereof.

The training 702 begins with training data 712, which is structured or unstructured data. According to one or more embodiments described herein, the training data 712 includes panoramic images and associated labels for objects of interest within the panoramic images. The training engine 716 receives the training data 712 and a model form 714. The model form 714 represents a base model that is untrained. The model form 714 can have preset weights and biases, which can be adjusted during training. It should be appreciated that the model form 714 can be selected from many different model forms depending on the task to be performed. For example, where the training 702 is to train a model to perform image classification, the model form 714 is a model form of a CNN. The training 702 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 712 includes labeled images, including images of the object of interest with associated labels (ground truth) and other images that do not include the object of interest with associated labels. In this example, the training engine 716 takes as input a training image from the training data 712, makes a prediction for classifying the image, and compares the prediction to the known label. The training engine 716 then adjusts weights and/or biases of the model based on results of the comparison, such as by using backpropagation. The training 702 is performed multiple times (referred to as "epochs") until a suitable model is trained (e.g., the trained model 718).

Once trained, the trained model 718 can be used to perform inference 704 to perform a task, such as to detect objects using panoramic images. The inference engine 720 applies the trained model 718 to new data 722 (e.g., real-world, non-training data). For example, if the trained model 718 is trained to classify images of a particular object, such as a forklift, the new data 722 can be an image of a forklift that was not part of the training data 712. In this way, the new data 722 represents data to which the model 718 has not been exposed. The inference engine 720 makes a prediction 724 (e.g., a classification of an object in an image of the new data 722) and passes the prediction 724 to the system 726 (e.g., the processing system 600 of FIG. 6). The system 726 can, based on the prediction 724, taken an action, perform an operation, perform an analysis, and/or the like, including combinations and/or multiples thereof. In some embodiments, the system 726 can add to and/or modify the new data 722 based on the prediction 724.

In accordance with one or more embodiments, the predictions 724 generated by the inference engine 720 are periodically monitored and verified to ensure that the inference engine 720 is operating as expected. Based on the verification, additional training 702 occurs using the trained model 718 as the starting point. The additional training 702 includes all or a subset of the original training data 712 and/or new training data 712. In accordance with one or more embodiments, the training 702 includes updating the trained model 718 to account for changes in expected input data.

Once an object has been detected using the trained model 718, 3D data (e.g., 3D coordinates, such as (x,y,z) coordinates)) for the object can be obtained from the 3D data collected by the 3D coordinate measurement device(s). The 3D data for the object can be used to create or update a 3D model (e.g., a point cloud) for the object. Thus, panoramic images captured, such as by one or more of the cameras 621, at different points in time can be used to create a more complete digital model (e.g., 3D model) of an object. This reduces or eliminates the need to generate a 3D model for the object by separately scanning the specific object(s), such as with one or more of the 3D coordinate measurement devices 620, thereby saving processing and memory resources of the 3D coordinate measurement device.

With continued reference to FIG. 6, the features and functionality of the data capture engine 612, the machine learning engine 614, and the analysis engine 616 are now described in more detail with reference to the following figures. For example, FIG. 8A depicts a flow diagram of a method 800 for generating and/or updating a 3D model of an object using panoramic images of an environment is shown according to one or more embodiments described herein. The method 800 can be performed by any suitable system and/or device, such as the processing system 600 of FIG. 6, the machine learning training and inference system 700 of FIG. 7, and/or the processing system 1300 of FIG. 13, and/or combinations thereof. The method 800 is now described with reference to FIGS. 6 and 7 but is not so limited.

At block 802, the processing system 600 detects an object in a panoramic image of an environment (e.g., the environment 622). According to one or more embodiments described herein, the ML engine 614 of the processing system 600 uses a trained ML model (e.g., the trained model 718) to detect the object in the panoramic image of the environment.

Conventional object detection techniques can be applied to perform object detection on 2D perspective images. For example, pretrained 2D instance segmentation models exist that provide for detecting objects in 2D perspective images. However, the performance of such models on equirectangular panoramic images (or "panoramic images") are inadequate due to the optical distortions present in panoramic images. For example, a straight line on a perspective image appears as a curved line in a panoramic image. In an effort to address this shortcoming, one or more embodiments described herein provide for training an ML model, using panoramic images, to detect objects in panoramic images.

One approach to training an ML model to detect objects in panoramic images is to use panoramic images directly as training data by labeling specific objects contained within the panoramic images.

Since many pretrained models are trained on perspective images and can support transfer learning, another approach to training an ML model to detect objects in panoramic images is to create 2D perspective images from panoramic images and use the created 2D perspective images to train and/or update an ML model to detect objects in panoramic images. For example, in transfer learning, an existing pretrained model is modified by adding a new class (e.g., object category) to that model. Transfer learning can therefore provide more robust models than models where transfer learning is not applied.

FIG. 8B depicts a flow diagram of a method 820 for training a machine learning model to detect objects in panoramic images according to one or more embodiments described herein. The method 820 can be performed by any suitable system and/or device, such as the processing system 600 of FIG. 6, the machine learning training and inference system 700 of FIG. 7, and/or the processing system 1300 of FIG. 13, and/or combinations thereof. The method 820 is now described with reference to FIGS. 6 and 7 but is not so limited.

Figure 9A:
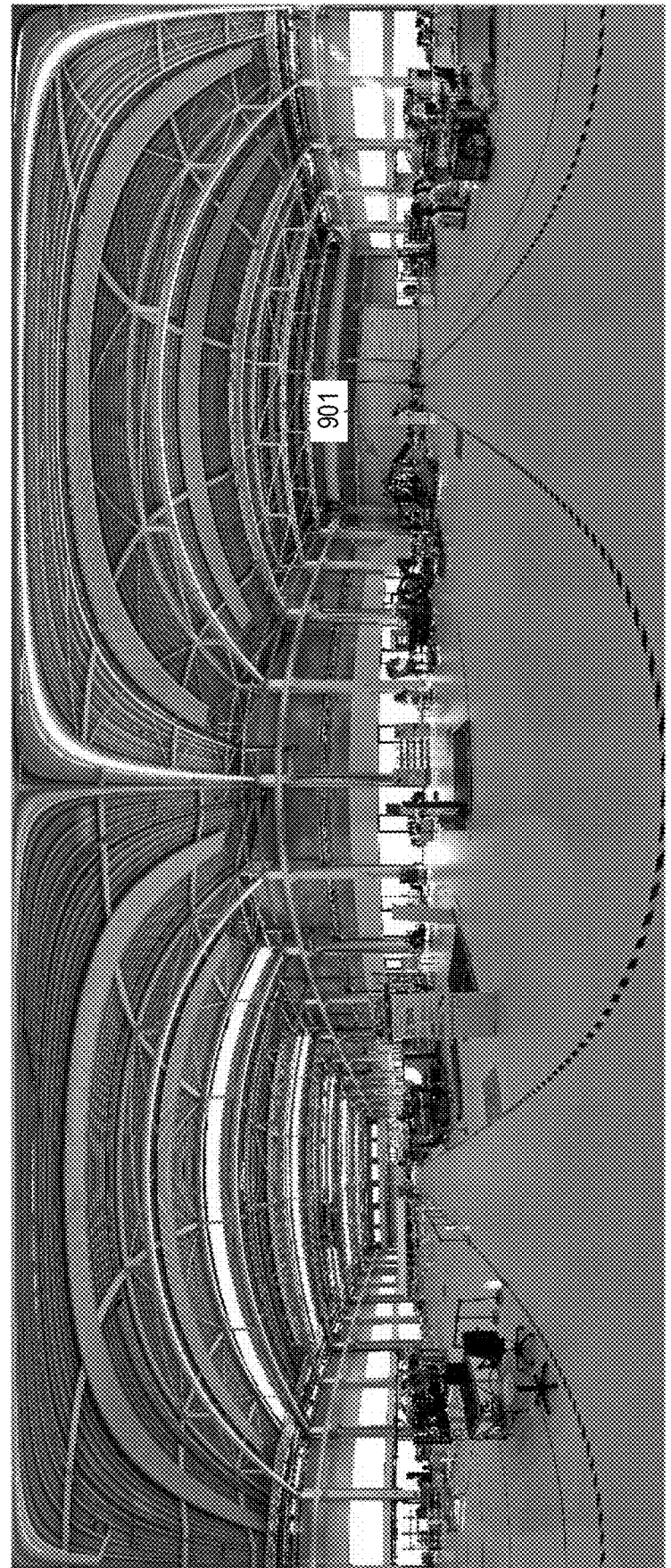
FIG. 9A is a panoramic image according to one or more embodiments described herein.

At block 822, the processing system 600 receives training panoramic images. The training panoramic images are panoramic images taken of an environment (or multiple environments). One or more panoramic images can include an object of interest. FIG. 9A depicts an example of a panoramic image 900 according to one or more embodiments described herein. The panoramic image 900 is an example of a training panoramic image and includes an object of interest 901 (e.g., a forklift).

Figure 9B:
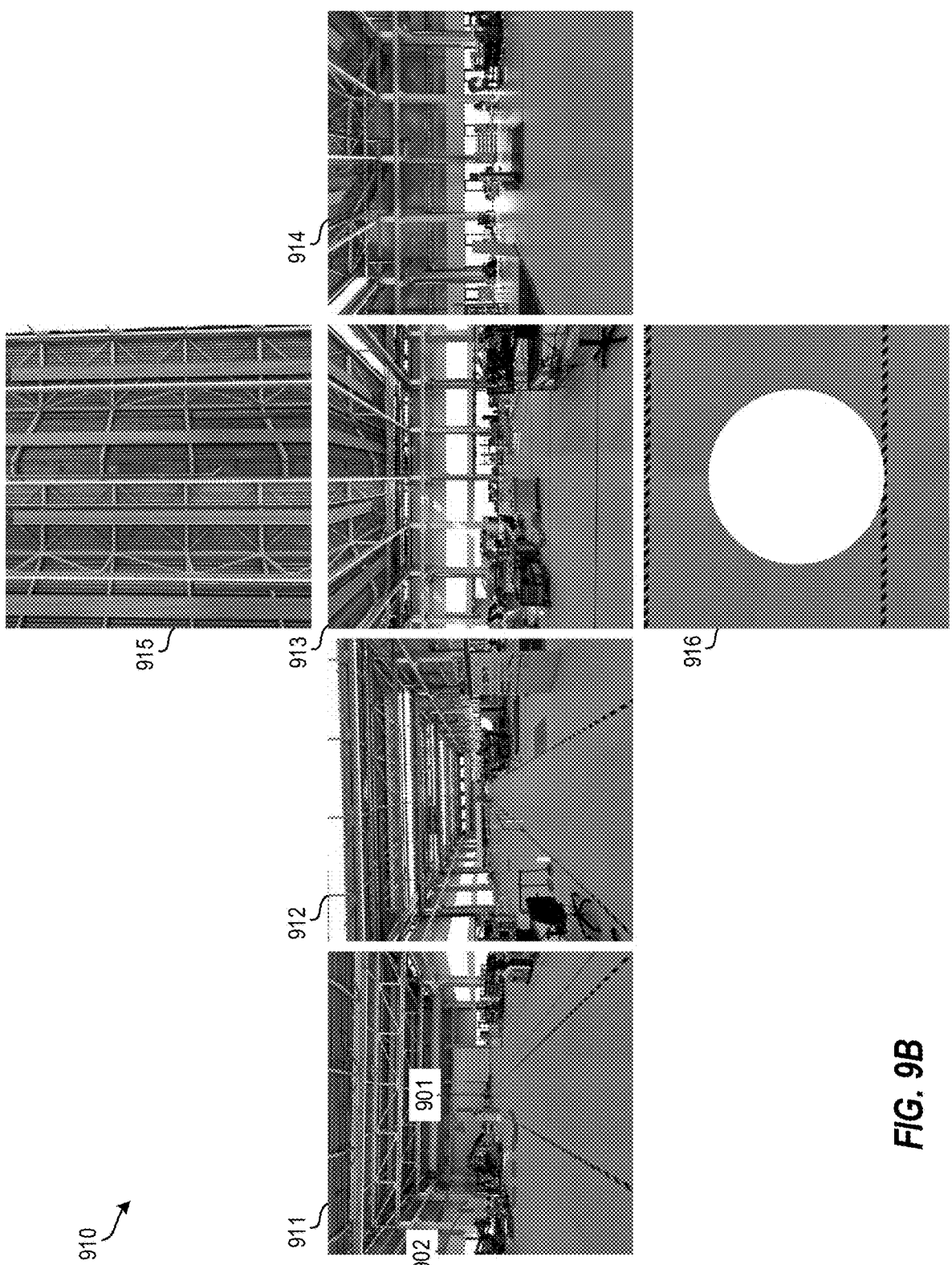
FIG. 9B is a cubemap created from the panoramic image of FIG. 9A according to one or more embodiments described herein.

At block 824, for each of the plurality of training panoramic images, the following occurs, for example. First, the processing system 600 generates a training cubemap representation having six 2D training perspective images. Particularly, one option to create 2D perspective images from a panoramic image is to create a cubemap representation of the panoramic image and use the resulting cubemap representation to train the ML model. A cubemap representation is a projection of the panoramic image into a form of a cube having six sides. Thus, a cubemap representation includes six 2D perspective images corresponding to portions of the panoramic image as follows: a left image, a front image, a right image, a back image, a top image, and a bottom image, where the directional descriptors are relative to the location at which the panoramic image was captured. As an example, FIG. 9B depicts a cubemap 910 created from a panoramic image 900 shown in FIG. 9A. FIG. 9B depicts a cubemap 910 that includes six 2D perspective images, which are examples of 2D training perspective images, as follows: image 911 (back image), image 912 (left image), image 913 (front image), image 914 (right image), image 915 (top image), image 916 (bottom image) for the panoramic image 900. The six 2D perspective images 911-916 can be used to train a new ML model and/or to update an existing (e.g., pretrained) ML model using transfer learning. Second, for each of the plurality of training panoramic images, a label is associated with an object of interest in at least one of the 2D training perspective images. For example, specific objects can be labeled in the 2D perspective images, and the labeled 2D perspective images can then be used to train and/or update an ML model to detect the specific objects. With reference to FIG. 9B, the image 911, which is an example 2D training perspective image, can have a label "forklift" associated therewith.

At block 826, the processing system 600 (e.g., using the ML engine 614), trains the machine learning model using as input the 2D training perspective images (e.g., the images 911-916 of FIG. 9B) and the associated label (e.g., "forklift"). The machine learning model is trained to detect the object of interest (e.g., the forklift) and to associated a bounding box around the object of interest as is further described herein. According to one or more embodiments described herein, the machine learning model can be a type of CNN, which are a class of deep, feed-forward ANNs that are particularly useful at tasks such as, but not limited to analyzing visual imagery.

Additional processes also are included, and it should be understood that the process depicted in FIG. 8B represents an illustration, and that other processes are added or existing processes are removed, modified, or rearranged without departing from the scope of the present disclosure.

With continued reference to FIG. 8A block 802, once trained, the ML model can be used to detect an object in the panoramic image of the environment, a process known as inference. To detect an object in a panoramic image, a cubemap representation of the panoramic image is created (see, e.g., FIG. 9B). The six 2D perspective images corresponding to portions of the panoramic image are fed into the trained ML model to detect an object. The ML model identifies the object of interest and generates a bounding box around the object of interest. For example, with reference to FIGS. 9A and 9B, the panoramic image 900 includes an object of interest 901, which in this example is a forklift but could be any object. As shown in FIG. 9B, the ML model identifies the object of interest 901 and generates a bounding box 902 around the object of interest 901. It should be appreciated that the bounding box can take different forms/shapes in other embodiments. For example, the bounding box can be any regular or irregular polygon. As an example, where the object of interest is a forklift as in FIG. 9B, the bounding box could be an outline of the forklift. As another example, as shown in FIG. 9B, the bounding box can be a rectangle around the object of interest.

With continued reference to FIG. 8A, block 804, the analysis engine 616 of the processing system 600 determines 3D coordinates for the object. For example, the bounding box can back project to the panoramic image to determine spherical coordinates for the bounding box. The spherical coordinates can be used to visualize the detection of the object of interest on the panoramic image in a process known as gnomonic projection. Visualizing the detection can include displaying, on a display, the bounding box associated with the object of interest on the panoramic image. The spherical coordinates can also be used to determine 3D coordinates for the object of interest using the 3D data (e.g., the 3D data 609a) generated by a 3D coordinate measurement device (e.g., the 3D coordinate measurement device 620). For example, points from the data derived from the panoramic image can be matched, using the spherical coordinates, with points in the 3D data to determine a correspondence to align the points from the panoramic image with the 3D data. Then, points from the panoramic image not found in the 3D data can be added to the 3D data.

At block 806, once the 3D coordinates (e.g., from the 3D data 609a) of the object are determined, the 3D coordinates for the object are combined with an existing 3D model (e.g., 3D model 609c of FIG. 6) of the object to create a revised 3D model of the object. For example, the data store 608 of the processing system 600 can store a 3D model 609c of an object or objects, such as the object of interest. According to one or more embodiments described herein, the 3D model 609c can be stored in another suitable data store external to the processing system 600, such as in a cloud storage repository of a cloud computing environment. The 3D model 609c can be generated, for example, using the 3D data 609a captured by one or more of the 3D coordinate measurement devices 620. The capturing of the 3D data 609a can be triggered by the data capture engine 612 of the processing system 600. The 3D model 609c can be a point cloud, a closed service representation, or another suitable model. By detecting objects of interest in the panoramic images (block 802) and determining 3D coordinates for the object of interest (block 804), the 3D model 609c can be updated/improved. For example, as an object of interest moves throughout an environment and/or as one or more of the cameras 621 move relative to the object of interest, additional views or additional detail of the object of interest can be captured by the one or more cameras 621. The additional views/details of the object of interest can be used to generate new 3D coordinates for the object, which can be incorporated into the 3D model for the object of interest, thereby improving the 3D model.

According to one or more embodiments described herein, the 3D coordinates for the object of interest can be combined into the 3D model (e.g., the 3D model 609c) using point-to-point correspondence. Approaches to point-to-point correspondence identify a set of correspondences between the 3D coordinates for the object of interest and coordinates of points of the 3D model by comparing feature points. For feature points to be useful, the feature points should be robust to transformations, robust to noise, and resolution invariant. Rigid transformations (e.g., ones that do not change the distance between 3D points) like translations and rotations should not affect the feature. Measurement errors that cause noise should not change the feature estimation significantly. Sampling with different density (e.g., after performing down sampling) should produce similar results. Where these aspects are not easily satisfied, a descriptor-based approach can be implemented, which is now described.

According to one or more embodiments described herein, the 3D coordinates for the object of interest can be combined into the 3D model using feature point descriptors. To unequivocally identify a point across multiple point clouds (e.g., between the 3D coordinates about the object of interest and the existing 3D model), regardless of the noise, resolution, or transformations, feature point descriptors (or simply "descriptors") can be used according to one or more embodiments described herein. Descriptors provide a more complex and precise signature of a point because descriptors encode information about the surrounding geometry. According to one or more embodiments described herein, the descriptors can capture additional data about the object of interest associated with the descriptors, like the view point, which provides the pose (e.g., orientation and position) of the object of interest. Examples of descriptors include, but are not limited to: point feature histogram; fast point feature histogram; radius-based surface descriptor; 3D shape context; unique shape context; signatures of histograms of orientations; spin image; rotation-invariant feature transform; normal aligned radial feature; rotational projection statistics; viewpoint feature histogram; clustered viewpoint feature histogram; oriented, unique, and repeatable clustered view point feature histogram; ensemble of shape functions; global fast point feature histogram; and global radius-based surface descriptor.

According to one or more embodiments described herein, the signature of histograms of orientations (SHOT) can be used. The SHOT descriptor encodes information about the topology (e.g., surface) within a spherical support structure. Multiple feature point descriptors are identified for the object of interest according to one or more embodiments described herein.

Figure 10:
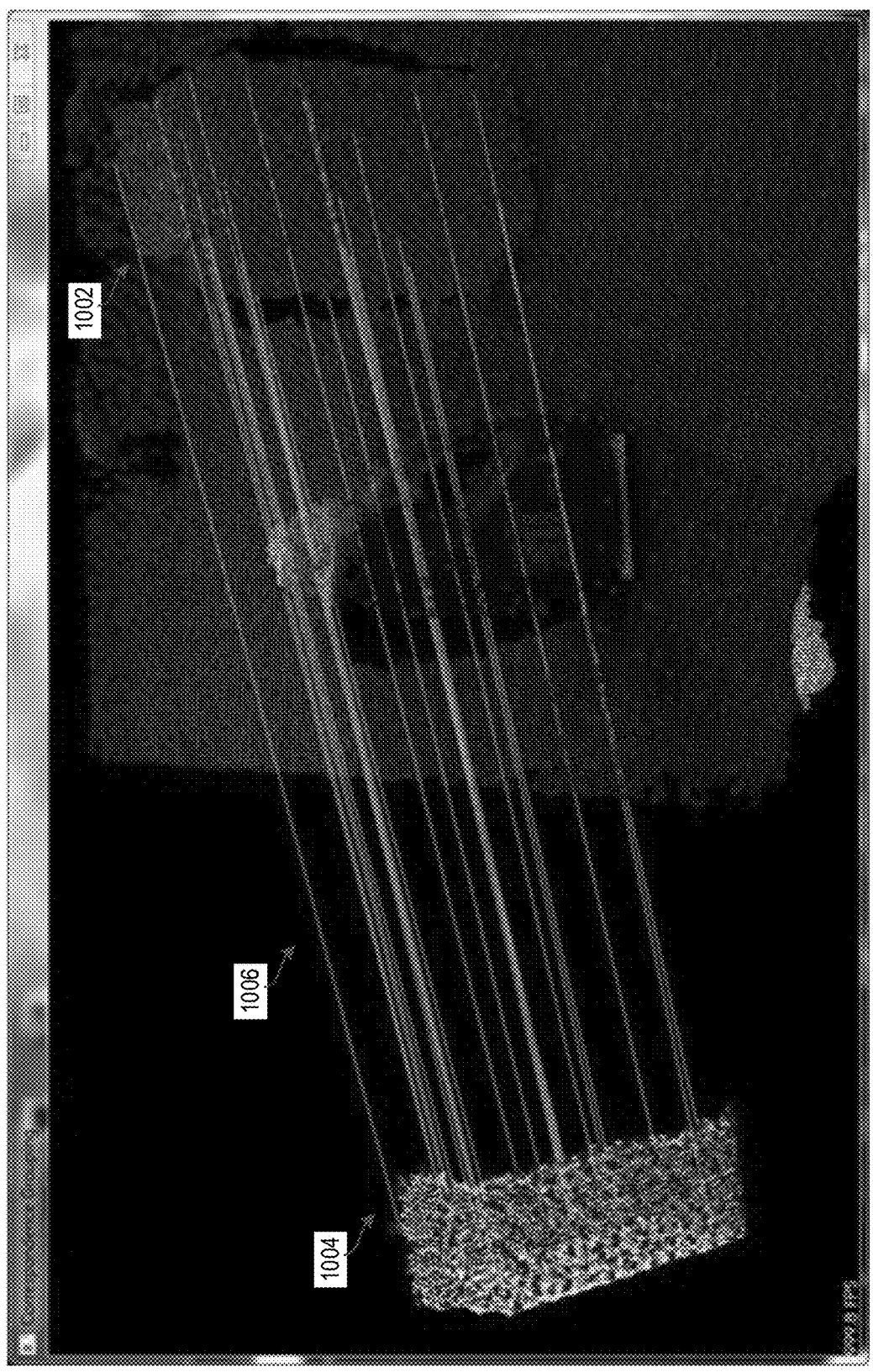
FIG. 10 is a screen shot of an interface showing matching feature points between 3D coordinates for an object of interest and a 3D model using feature point descriptors according to one or more embodiments described herein.

After the feature point descriptors have been computed, the feature point descriptors between the object of interest and the 3D model of the object of interest are matched (e.g., alignment is performed) to find correspondences between the two data sets. For this, a search structure, such as a k-d tree, can be used to perform a nearest neighbor search, retrieving the Euclidean distances between descriptors. According to one or more embodiments described herein, a maximum distance value for the Euclidean distances can be used as a threshold, which prevents data points that are above the threshold from being used for correspondences. According to one or more embodiments described herein, each descriptor from the 3D coordinates for the object of interest is matched against a corresponding descriptors from the 3D model for the object of interest. FIG. 10 is a screen shot of an interface 1000 showing matching feature points between 3D coordinates for an object of interest 1002 and a 3D model 1004 using feature point descriptors (shown connected by correspondences 1006) according to one or more embodiments described herein.

With continued reference to FIG. 8A, at block 806, the analysis engine 616 of the processing system 600 combines the 3D coordinates for the object of interest with an existing 3D model (e.g., the 3D model 609c) of the object to create a revised 3D model of the object of interest. Thus, the processing system 600 can combine data from panoramic images containing the object of interest taken at different points of time to created and/or update the 3D model of the object of interest. According to one or more embodiments described herein, to combine the data, a list of point clouds for the object of interest (e.g., at different points of time) can be created. Then, pairwise matching can be performed using feature point descriptors as described with respect to block 804. If a pair of data points can be matched between point clouds (e.g., the 3D coordinates for the object of interest and corresponding 3D data in the 3D model 609c), the matched point cloud is added to the list of point clouds. This process leads to a more completed model for the object of interest.

Additional processes also are included, and it should be understood that the process depicted in FIG. 8A represents an illustration, and that other processes are added or existing processes are removed, modified, or rearranged without departing from the scope of the present disclosure.

One or more of the embodiments described herein provide for leveraging pretrained models for 2D perspective images to detect objects of interest in panoramic images. This improves existing computer functionality by enabling a computer to detect objects of interest in panoramic images. In turn, a user is enabled to search for objects of interest in large stores of panoramic images that would otherwise not be possible.

In some situations, an object of interest appears in multiple panoramic images captured at substantially the same time (e.g., sequentially in a series). For example, where the environment is a construction site, a panoramic camera is moved throughout the construction site to capture panoramic images along a certain path at intervals (e.g., every few meters). These panoramic images can be combined to create a broader view of the construction site (e.g., to capture more of the construction site than a single panoramic image might contain). As a result, a target object appears in adjacent panoramic images and thus is repeatedly detected using the ML model as described herein (see, e.g., block 802 of FIG. 8A). That is, the ML model creates multiple bounding boxes for the same object of interest. One or more embodiments described herein provide for detecting and filtering duplicate objects of interest within panoramic images by generating frustums, filtering frustums, and performing feature matching filtering, which are described in more detail herein.

According to an embodiment, a 2D equirectangular panoramic image is represented as a 3D sphere using 3D spherical coordinates as described herein. A frustum can be generated by connecting the four points of a bounding box for an object of interest with a center of the sphere. This can be done for each panoramic image. If two different frustums from two spheres have a sufficient degree of overlap (e.g., enough overlap to satisfy a threshold (e.g., 40% overlap, 70% overlap, 85% overlap, and/or the like)) and/or belong to the same category, it is likely that the two frustums are pointing to the same object of interest. Thus, one of them can be filtered out (e.g., removed). Feature matching filtering can then be performed on the contents of the bounding boxes for any non-filtered (e.g., remaining) frustums. Further filtering can be performed where a sufficient degree of overlap exists (e.g., enough overlap to satisfy a threshold (e.g., 40% overlap, 70% overlap, 85% overlap, and/or the like)).

With reference to FIG. 11, a method 1100 for filtering objects of interest from a plurality of panoramic images is now described according to one or more embodiments described herein. The method 1100 can be performed by any suitable system and/or device, such as the processing system 600 of FIG. 6, the machine learning training and inference system 700 of FIG. 7, and/or the processing system 1300 of FIG. 13, and/or combinations thereof. The method 800 is now described with reference to FIGS. 6 and 7 but is not so limited.

At blocks 1102 and 1104, the processing system 600, using the machine learning engine 614, detects objects of interest in panoramic images of an environment as described herein with respect to FIG. 8A. Particularly, at block 1102, the processing system 600 detects, using a trained machine learning model, a first object of interest in a first panoramic image of an environment to generate a first bounding box. Similarly, at block 1104, the processing system 600 detects, using the trained machine learning model a second object of interest in a second panoramic image of an environment to generate a second bounding box. According to one or more embodiments described herein, each of the first bounding box and the second bounding box are denoted by four points in the panoramic image.

At blocks 1106 and 1108, the processing system 600, using the analysis engine 616, generates frustums based on the bounding boxes from blocks 802 and 804, respectively. Particularly, at block 1106, the processing system 600 generates a first frustum based at least in part on the first bounding box. Similarly, at block 1108, the processing system 600 generates a second frustum based at least in part on the second bounding box.

Generating (or building) frustums is now described in more detail. Consider an equirectangular panoramic image with size W×H pixels. A point on the panoramic image can be denoted by the 2D coordinates (x,y). The point can be converted from rectangular coordinates for the panoramic image to spherical coordinates, where the sphere center O is the position of the panoramic camera 622. For the point (x,y) from the panoramic image, the spherical coordinates are $\theta=2\pi x/W$, $\psi=\pi y/H$. Given that a bounding box is defined by, for example, four points in the panoramic image, these points on the sphere can be connected to the sphere center O to obtain the frustum for the bounding box.

At block 1110, the analysis engine 616 of the processing system 600 performs frustum filtering based at least in part on the first frustum (block 1106) and the second frustum (block 1108). The edges of the frustum can be represented as vectors. However, the lengths of the vectors are uncertain because the original panoramic image does not contain depth information.

Frustum filtering can be based on volume overlap for the first and second objects of interest and/or predicted categories for the first and second objects of interest.

A first approach to volume overlap filtering is now described. According to one or more embodiments described herein, the position where two frustums intersect can be calculated to determine the distance between the intersection position and the panoramic camera 621. The processing system 600, using the analysis engine 616, can then evaluate whether the calculated distance is realistic. For example, the calculated distance can be compared to a threshold (e.g., 0.5 meters, 1 meter, 2 meters, 5 meters, and/or the like). If the distance satisfies the threshold, the calculated distance is said to be realistic; however, if the distance exceeds the threshold, the calculated distance is said to be unrealistic. Where the calculated distance is realistic, the two frustums are considered to relate to the same object of interest, and thus one of them can be filtered out (e.g., removed). Otherwise, the objects are considered to be different.

A second approach to volume overlap filtering is now described. According to one or more embodiments described herein, the distance between a target of interest and the panoramic camera 621 can be estimated. The estimated distance is used as a threshold such that if the intersection of two frustums exceeds the threshold, the two frustums do not intersect, which indicates that the frustums likely relate to two different objects of interest. If the estimated distance is not exceeded by the intersection of the two frustums, the two frustums are considered to relate to the same object of interest, and thus one of them can be filtered out (e.g., removed). Otherwise, the objects are considered to be different.

These two approaches to volume overlap filtering work in the scenario where 2D information is available without depth information. However, where depth information (e.g., 3D information) is available, the 3D position of the first and second objects of interest can be calculated and if the 3D coordinates overlap, the first and second objects of interest are considered the same.

In addition to filtering by volume overlap as already described, the frustum filtering can be performed using the category of prediction for the first and second objects of interest. For example, the machine learning engine 612 can predict a category for each of the first object of interest and the second object of interest. If the categories different, then the first and second objects of interest are likely different and therefore volume overlap filtering can be skipped altogether. If the categories are the same, the first and second objects of interest are considered the same and/or are further evaluated using frustum filtering as described herein.

Although frustum filtering is described with respect to two frustums for two bounding boxes of two objects of interest generated from two panoramic images, it should be appreciated that frustum filtering can be performed for more than two frustums and/or for multiple objects of interest. In some cases, after frustum filtering is performed, additional filtering can be performed on remaining bounding boxes. For example, at block 1112, the analysis engine 616 of the processing system 600 can perform feature matching filtering based at least in part on the first panoramic image and the second panoramic image. Feature matching filtering is performed to determine whether the objects of interest are the same for the first and second panoramic images, for example, or whether the objects of interest are different.

According to one or more embodiments described herein, feature matching filtering can be performed as shown in FIG. 12. In particular, FIG. 12 is a flow diagram of a method 1200 for performing feature matching filtering according to one or more embodiments described herein. The method 800 can be performed by any suitable system and/or device, such as the processing system 600 of FIG. 6, the machine learning training and inference system 700 of FIG. 7, and/or the processing system 1300 of FIG. 13, and/or combinations thereof.

At block 1202, a portion of the panoramic image within the bounding box can be cropped. For example, the analysis engine 616 crops a first portion of the first panoramic image within the first bounding box and crops a second portion of the second panoramic image within the second bounding box.

At block 1204, the analysis engine 616 performs feature point detection on the first portion of the first panoramic image and the second portion of the second panoramic image. According to one or more embodiments described herein, the feature point detection can include corner point detection. Two possible approaches for corner point detection are the Harris corner point detection approach and the Oriented FAST and Rotated BRIEF (ORB) approach, but other approaches are also possible.

At block 1206, the analysis engine 616 generates feature point descriptors for detected feature points. The feature point descriptors can be generated in accordance with one or more embodiments described herein. Constructing feature point descriptors ensures that detected features are invariant across images regardless of image translation, rotation, illumination, and/or the like including combinations and/or multiples thereof. Using feature point descriptors provides for feature point detection to be performed on the same features on different images. One possible approach to generating feature point descriptors is the multiscale oriented patches descriptor (MOPS) approach, but other approaches are also possible.

At block 1208, the analysis engine 616 matches the first portion of the first panoramic image and the second portion of the second panoramic image. Various approaches to image matching can be used, such as a brute force matching approach, a fast library for approximate nearest neighbor (FLANN) approach, and/or the like including combinations and/or multiples thereof.

At block 1210, the analysis engine 616 evaluates the matching to determine whether the first bounding box and the second bounding box contain the same object of interest. As an example, a match is considered as valid if a point in the first panoramic image and a corresponding point from the first panoramic image projected to the second panoramic image are less than a threshold distance (e.g., 2.5 pixels) away. For the evaluation, it is useful to know the distance the panoramic camera moved between the location where the first panoramic image was captured and the second panoramic image was captured.

Additional processes also are included, and it should be understood that the processes depicted in FIGS. 11 and 12 represent illustrations, and that other processes are added or existing processes are removed, modified, or rearranged without departing from the scope of the present disclosure.

The one or more embodiments that provide for detecting and filtering duplicate objects of interest within panoramic images provides for a user to count the number of objects with 2D object detection approaches. This offers the possibility of automatic counting objects via artificial intelligence, for example, and can further provide for automated processes like invoicing or inventory control.

It is understood that one or more embodiments described herein is capable of being implemented in conjunction with any other type of computing environment now known or later developed. For example, FIG. 13 depicts a block diagram of a processing system 1300 for implementing the techniques described herein. In accordance with one or more embodiments described herein, the processing system 1300 is an example of a cloud computing node of a cloud computing environment. In examples, processing system 1300 has one or more central processing units ("processors" or "processing resources" or "processing devices") 1321a, 1321b, 1321c, etc. (collectively or generically referred to as processor(s) 1321 and/or as processing device(s)). In aspects of the present disclosure, each processor 1321 can include a reduced instruction set computer (RISC) microprocessor. Processors 1321 are coupled to system memory (e.g., random access memory (RAM) 1324) and various other components via a system bus 1333. Read only memory (ROM) 1322 is coupled to system bus 1333 and includes a basic input/output system (BIOS), which controls certain basic functions of processing system 1300.

Further depicted are an input/output (I/O) adapter 1327 and a network adapter 1326 coupled to system bus 1333. I/O adapter 1327 is a small computer system interface (SCSI) adapter that communicates with a hard disk 1323 and/or a storage device 1325 or any other similar component. I/O adapter 1327, hard disk 1323, and storage device 1325 are collectively referred to herein as mass storage 1334. Operating system 1340 for execution on processing system 1300 is stored in mass storage 1334. The network adapter 1326 interconnects system bus 1333 with an outside network 1336 enabling processing system 1300 to communicate with other such systems.

A display (e.g., a display monitor) 1335 is connected to system bus 1333 by display adapter 1332, which includes a graphics adapter to improve the performance of graphics intensive applications and a video controller. In one aspect of the present disclosure, adapters 1326, 1327, and/or 1332 is connected to one or more I/O busses that are connected to system bus 1333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1333 via user interface adapter 1328 and display adapter 1332. A keyboard 1329, mouse 1330, and speaker 1331 are interconnected to system bus 1333 via user interface adapter 1328, which includes, for example, a Super I/O chip integrating multiple device adapters into a single integrated circuit.

In some aspects of the present disclosure, processing system 1300 includes a graphics processing unit 1337. Graphics processing unit 1337 is a specialized electronic circuit designed to manipulate and alter memory to accelerate the creation of images in a frame buffer intended for output to a display. In general, graphics processing unit 1337 is very efficient at manipulating computer graphics and image processing, and has a highly parallel structure that makes it more effective than general-purpose CPUs for algorithms where processing of large blocks of data is done in parallel.

Thus, as configured herein, processing system 1300 includes processing capability in the form of processors 1321, storage capability including system memory (e.g., RAM 1324), and mass storage 1334, input means such as keyboard 13213 and mouse 1330, and output capability including speaker 1331 and display 1335. In some aspects of the present disclosure, a portion of system memory (e.g., RAM 1324) and mass storage 1334 collectively store the operating system 1340 to coordinate the functions of the various components shown in processing system 1300.

In addition to one or more of the features described herein, or as an alternative, further embodiments of the method includes that detecting the object of interest in the panoramic image of the environment includes generating, by the trained machine learning model, a bounding box for the object of interest.

In addition to one or more of the features described herein, or as an alternative, further embodiments of the method includes that determining the 3D coordinates for the object of interest includes back projecting the bounding box to the panoramic image to determine spherical coordinates for the object of interest.

In addition to one or more of the features described herein, or as an alternative, further embodiments of the method includes visualizing the detection of the object of interest on the panoramic image.

In addition to one or more of the features described herein, or as an alternative, further embodiments of the method includes that determining the 3D coordinates for the object of interest further includes using the spherical coordinates to determine the 3D coordinates for the object using 3D data captured by a 3D coordinate measurement device.

In addition to one or more of the features described herein, or as an alternative, further embodiments of the method includes capturing the panoramic image of the environment using a panoramic camera.

In addition to one or more of the features described herein, or as an alternative, further embodiments of the method includes that the panoramic camera is associated with a 3D coordinate measurement device.

In addition to one or more of the features described herein, or as an alternative, further embodiments of the method includes that the 3D coordinate measurement device is a laser scanner that includes: a scanner processing system including a scanner controller; a housing; and a 3D scanner disposed within the housing and operably coupled to the scanner processing system, the 3D scanner having a light source, a beam steering unit, a first angle measuring device, a second angle measuring device, and a light receiver, the beam steering unit cooperating with the light source and the light receiver to define a scan area, the light source and the light receiver configured to cooperate with the scanner processing system to determine a first distance to a first object point based at least in part on a transmitting of a light by the light source and a receiving of a reflected light by the light receiver, the 3D scanner configured to cooperate with the scanner processing system to determine 3D coordinates of the first object point based at least in part on the first distance, a first angle of rotation, and a second angle of rotation.

In addition to one or more of the features described herein, or as an alternative, further embodiments of the method includes that the panoramic camera has a substantially 360-degree field of view.

In addition to one or more of the features described herein, or as an alternative, further embodiments of the method includes training the machine learning model to detect the object of interest in the panoramic image of the environment.

In addition to one or more of the features described herein, or as an alternative, further embodiments of the method includes that training the machine learning model includes: receiving a plurality of training panoramic images; for each of the plurality of training panoramic images: generating a training cubemap representation having six two-dimensional (2D) training perspective images, and associating a label with the object of interest in at least one of the 2D training perspective images; and training the machine learning model using as input the 2D training perspective images and the associated labels, wherein the machine learning model generates a bounding box around the object of interest.

In addition to one or more of the features described herein, or as an alternative, further embodiments of the method includes that combining the 3D coordinates for the object of interest with the existing 3D model of the object of interest is based at least in part on a feature point descriptor for the object of interest.

In addition to one or more of the features described herein, or as an alternative, further embodiments of the method includes that the feature point descriptor is a signature of histograms of orientations feature point descriptor.

In addition to one or more of the features described herein, or as an alternative, further embodiments of the method includes that the existing 3D model is stored in a cloud storage repository of a cloud computing environment.

In addition to one or more of the features described herein, or as an alternative, further embodiments of the system includes that a three-dimensional (3D) coordinate measurement device to capture 3D data about an environment, the 3D coordinate measurement device being communicatively coupled to the processing system.

In addition to one or more of the features described herein, or as an alternative, further embodiments of the system includes that detecting the object of interest in the panoramic image of the environment includes generating, by the trained machine learning model, a bounding box for the object of interest, wherein determining the 3D coordinates for the object of interest includes back projecting the bounding box to the panoramic image to determine spherical coordinates for the object of interest and using the spherical coordinates to determine the 3D coordinates for the object of interest using 3D data captured by a 3D coordinate measurement device.

In addition to one or more of the features described herein, or as an alternative, further embodiments of the system includes that the operations further include capturing the panoramic image of the environment using a panoramic camera, wherein the panoramic camera has a substantially 360-degree field of view.

In addition to one or more of the features described herein, or as an alternative, further embodiments of the system includes that the operations further include training the machine learning model to detect the object of interest in the panoramic image of the environment.

In addition to one or more of the features described herein, or as an alternative, further embodiments of the system includes that training the machine learning model includes: receiving a plurality of training panoramic images; for each of the plurality of training panoramic images: generating a training cubemap representation having six two-dimensional (2D) training perspective images, and associating a label with an object of interest in at least one of the 2D training perspective images; and training the machine learning model using as input the 2D training perspective images and the associated labels, wherein the machine learning model generates a bounding box around the object of interest.

In addition to one or more of the features described herein, or as an alternative, further embodiments of the system includes that combining the 3D coordinates for the object of interest with the existing 3D model of the object of interest is based at least in part on a feature point descriptor for the object of interest.

In addition to one or more of the features described herein, or as an alternative, further embodiments of the system includes that the feature point descriptor is a signature of histograms of orientations feature point descriptor.

In addition to one or more of the features described herein, or as an alternative, further embodiments of the system includes that the plurality of training panoramic images are captured by the panoramic camera.

In addition to one or more of the features described herein, or as an alternative, further embodiments of the system includes that the panoramic camera has a substantially 360-degree field of view.

In addition to one or more of the features described herein, or as an alternative, further embodiments of the system includes that the machine learning model is a convolutional neural network.

In addition to one or more of the features described herein, or as an alternative, further embodiments of the system includes that the operations further include detecting, using the trained machine learning model, the object of interest in a panoramic image of the environment.

In addition to one or more of the features described herein, or as an alternative, further embodiments of the method includes that the frustum filtering is based at least in part on a distance between a panoramic camera and an intersection of the first frustum and the second frustum.

In addition to one or more of the features described herein, or as an alternative, further embodiments of the method includes that the first object of interest and the second object of interest are considered to be the same object of interest responsive to the distance satisfying the threshold.

In addition to one or more of the features described herein, or as an alternative, further embodiments of the method includes that the first object of interest and the second object of interest are considered to be different objects of interest responsive to the distance failing to satisfy the threshold.

In addition to one or more of the features described herein, or as an alternative, further embodiments of the method includes that the frustum filtering is based at least in part on an estimated distance between a target of interest and a panoramic camera and the intersection of the first frustum and the second frustum.

In addition to one or more of the features described herein, or as an alternative, further embodiments of the method includes that the first object of interest and the second object of interest are considered to be the same object of interest responsive to the intersection of the first frustum and the second frustum being within the estimated distance.

In addition to one or more of the features described herein, or as an alternative, further embodiments of the method includes that the first object of interest and the second object of interest are considered to be the same object of interest responsive to the intersection of the first frustum and the second frustum exceeding the estimated distance.

In addition to one or more of the features described herein, or as an alternative, further embodiments of the method includes that the frustum filtering is based at least in part on a predicted category of the object of interest.

In addition to one or more of the features described herein, or as an alternative, further embodiments of the method includes that the feature matching filtering includes: cropping a first portion of the first panoramic image within the first bounding box; and cropping a second portion of the second panoramic image within the second bounding box.

In addition to one or more of the features described herein, or as an alternative, further embodiments of the method includes that the feature matching filtering further includes performing feature point detection on the first portion of the first panoramic image and the second portion of the second panoramic image.

In addition to one or more of the features described herein, or as an alternative, further embodiments of the method includes that the feature matching filtering further includes generating feature point descriptors for detected feature points.

In addition to one or more of the features described herein, or as an alternative, further embodiments of the method includes that the feature matching filtering further includes matching the first portion of the first panoramic image and the second portion of the second panoramic image.

In addition to one or more of the features described herein, or as an alternative, further embodiments of the method includes that the feature matching filtering further includes evaluating the matching to determine whether the first bounding box and the second bounding box contain the same object of interest.

In addition to one or more of the features described herein, or as an alternative, further embodiments of the system includes that the frustum filtering is based at least in part on a distance between a panoramic camera and an intersection of the first frustum and the second frustum.

In addition to one or more of the features described herein, or as an alternative, further embodiments of the system includes that the first object of interest and the second object of interest are considered to be the same object of interest responsive to the distance satisfying the threshold.

In addition to one or more of the features described herein, or as an alternative, further embodiments of the system includes that the first object of interest and the second object of interest are considered to be different objects of interest responsive to the distance failing to satisfy the threshold.

In addition to one or more of the features described herein, or as an alternative, further embodiments of the system includes that the frustum filtering is based at least in part on an estimated distance between a target of interest and a panoramic camera and the intersection of the first frustum and the second frustum.

In addition to one or more of the features described herein, or as an alternative, further embodiments of the system includes that the first object of interest and the second object of interest are considered to be the same object of interest responsive to the intersection of the first frustum and the second frustum being within the estimated distance.

In addition to one or more of the features described herein, or as an alternative, further embodiments of the system includes that the first object of interest and the second object of interest are considered to be the same object of interest responsive to the intersection of the first frustum and the second frustum exceeding the estimated distance.

In addition to one or more of the features described herein, or as an alternative, further embodiments of the system includes that the frustum filtering is based at least in part on a predicted category of the object of interest.

In addition to one or more of the features described herein, or as an alternative, further embodiments of the system includes that the feature matching filtering includes: cropping a first portion of the first panoramic image within the first bounding box; and cropping a second portion of the second panoramic image within the second bounding box.

In addition to one or more of the features described herein, or as an alternative, further embodiments of the system includes that the feature matching filtering further includes performing feature point detection on the first portion of the first panoramic image and the second portion of the second panoramic image.

In addition to one or more of the features described herein, or as an alternative, further embodiments of the system includes that the feature matching filtering further includes generating feature point descriptors for detected feature points.

In addition to one or more of the features described herein, or as an alternative, further embodiments of the system includes that the feature matching filtering further includes matching the first portion of the first panoramic image and the second portion of the second panoramic image.

In addition to one or more of the features described herein, or as an alternative, further embodiments of the system includes that the feature matching filtering further includes evaluating the matching to determine whether the first bounding box and the second bounding box contain the same object of interest.

It will be appreciated that one or more embodiments described herein may be embodied as a system, method, or computer program product and may take the form of a hardware embodiment, a software embodiment (including firmware, resident software, micro-code, etc.), or a combination thereof. Furthermore, one or more embodiments described herein may take the form of a computer program product embodied in one or more computer readable medium(s) having computer readable program code embodied thereon.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system comprising:

a panoramic camera to capture panoramic images of the environment; and a processing system communicatively coupled to the panoramic camera, the processing system comprising:

a memory comprising computer readable instructions; and a processing device for executing the computer readable instructions, the computer readable instructions controlling the processing device to perform operations for generating a three-dimensional (3D) model of an object of interest using panoramic images of an environment, the operations comprising:

detecting, using a trained machine learning model, the object of interest in a panoramic image of the environment;

determining 3D coordinates for the object of interest;

wherein detecting the object of interest in the panoramic image of the environment comprises generating, by the trained machine learning model, a bounding box for the object of interest, wherein determining the 3D coordinates for the object of interest comprises back projecting the bounding box to the panoramic image to determine spherical coordinates for the object of interest and using the spherical coordinates to determine the 3D coordinates for the object of interest using 3D data captured by a 3D coordinate measurement device; and combining the 3D coordinates for the object of interest with an existing 3D model of the object of interest to create a revised 3D model of the object of interest.

2. The system of claim 1, further comprising a three-dimensional (3D) coordinate measurement device to capture 3D data about an environment, the 3D coordinate measurement device being communicatively coupled to the processing system.

3. The system of claim 1, wherein the operations further comprise capturing the panoramic image of the environment using a panoramic camera, wherein the panoramic camera has a substantially 360-degree field of view.

4. The system of claim 1, wherein the operations further comprise training the machine learning model to detect the object of interest in the panoramic image of the environment.

5. The system of claim 4, wherein training the machine learning model comprises:

receiving a plurality of training panoramic images;

for each of the plurality of training panoramic images:

generating a training cubemap representation comprising six two-dimensional (2D) training perspective images, and associating a label with an object of interest in at least one of the 2D training perspective images; and training the machine learning model using as input the 2D training perspective images and the associated labels, wherein the machine learning model generates a bounding box around the object of interest.

6. The system of claim 1, wherein combining the 3D coordinates for the object of interest with the existing 3D model of the object of interest is based at least in part on a feature point descriptor for the object of interest.

7. The system of claim 6, wherein the feature point descriptor is a signature of histograms of orientations feature point descriptor.

8. A method comprising:

detecting, using a trained machine learning model, a first object of interest in a first panoramic image of an environment to generate a first bounding box;

detecting, using the trained machine learning model, a second object of interest in a second panoramic image of the environment to generate a second bounding box;

generating a first frustum based at least in part on the first bounding box;

generating a second frustum based at least in part on the second bounding box;

performing frustum filtering based at least in part on the first frustum and the second frustum;

wherein the frustum filtering is based at least in part on a distance between a panoramic camera and an intersection of the first frustum and the second frustum;

performing feature matching filtering based at least in part on the first panoramic image and the second panoramic image; and determining whether the first object of interest and the second object of interest are the same object of interest based at least in part on results of the frustum filtering and results of the feature matching filtering.

9. The method of claim 8, wherein the first object of interest and the second object of interest are considered to be the same object of interest responsive to the distance satisfying the threshold.

10. The method of claim 8, wherein the first object of interest and the second object of interest are considered to be different objects of interest responsive to the distance failing to satisfy the threshold.

11. The method of claim 8, wherein the frustum filtering is based at least in part on an estimated distance between a target of interest and a panoramic camera, and the intersection of the first frustum and the second frustum.

12. The method of claim 11, wherein:

the first object of interest and the second object of interest are considered to be the same object of interest, responsive to the intersection of the first frustum and the second frustum not exceeding the estimated distance, and the first object of interest and the second object of interest are considered to be different objects of interest, responsive to the intersection of the first frustum and the second frustum exceeding the estimated distance.

13. The method of claim 8, wherein the frustum filtering is based at least in part on a predicted category of the object of interest.

14. The method of claim 8, wherein the feature matching filtering comprises:

cropping a first portion of the first panoramic image within the first bounding box; and cropping a second portion of the second panoramic image within the second bounding box.

15. The method of claim 14, wherein the feature matching filtering further comprises performing feature point detection on the first portion of the first panoramic image and the second portion of the second panoramic image.

16. The method of claim 15, wherein the feature matching filtering further comprises generating feature point descriptors for detected feature points.

17. The method of claim 16, wherein the feature matching filtering further comprises matching the first portion of the first panoramic image and the second portion of the second panoramic image.

18. The method of claim 17, wherein the feature matching filtering further comprises evaluating the matching to determine whether the first bounding box and the second bounding box contain the same object of interest.

19. A method comprising:

detecting, using a trained machine learning model, a first object of interest in a first panoramic image of an environment to generate a first bounding box;

detecting, using the trained machine learning model, a second object of interest in a second panoramic image of the environment to generate a second bounding box;

generating a first frustum based at least in part on the first bounding box;

generating a second frustum based at least in part on the second bounding box;

performing frustum filtering based at least in part on the first frustum and the second frustum;

wherein the frustum filtering is based at least in part on an estimated distance between a target of interest and a panoramic camera, and an intersection of the first frustum and the second frustum;

performing feature matching filtering based at least in part on the first panoramic image and the second panoramic image; and determining whether the first object of interest and the second object of interest are the same object of interest based at least in part on results of the frustum filtering and results of the feature matching filtering.

20. The method of claim 19, wherein:

the first object of interest and the second object of interest are considered to be the same object of interest, responsive to the intersection of the first frustum and the second frustum not exceeding the estimated distance, and the first object of interest and the second object of interest are considered to be different objects of interest, responsive to the intersection of the first frustum and the second frustum exceeding the estimated distance.

* * * * *